United States Patent
Drayton et al.

(10) Patent No.: US 11,481,723 B2
(45) Date of Patent: *Oct. 25, 2022

(54) METHOD, SYSTEM, AND MEDIA FOR MANAGEMENT AND ORGANIZATION OF PERSONAL PROPERTY

(71) Applicant: WayForth Inc., Richmond, VA (US)

(72) Inventors: John Terrence Drayton, Medina, WA (US); Rodney Joe Hatfield, Seattle, WA (US); Robert Allen Jones, Jr., Lake Mary, FL (US); Michael Laverne Smith, Tacoma, WA (US)

(73) Assignee: WayForth Inc., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,261

(22) Filed: Oct. 5, 2020

(65) Prior Publication Data

US 2021/0256462 A1    Aug. 19, 2021

Related U.S. Application Data

(63) Continuation of application No. 15/356,326, filed on Nov. 18, 2016, now Pat. No. 10,796,273.

(51) Int. Cl.
*G06Q 10/00* (2012.01)
*G06Q 10/08* (2012.01)
(Continued)

(52) U.S. Cl.
CPC ....... *G06Q 10/087* (2013.01); *G06Q 30/0635* (2013.01); *G06F 16/2358* (2019.01)

(58) Field of Classification Search
CPC .......... G06Q 30/0635; G06Q 30/0639; G06Q 10/087; G06F 16/2358

(Continued)

(56) References Cited

U.S. PATENT DOCUMENTS 5,442,730 A    8/1995  Bigus
6,370,222 B1   4/2002  Cornick, Jr.
(Continued)

OTHER PUBLICATIONS

Kärkkäinen, M., Ala-Risku, T., Främling, K., Collin, J. and Holmström, J., Implementing Inventory Transparency to Temporary Storage Locations: a solution design experiment in project business, 2010, International Journal of Managing Projects in Business, 3(2), pp. 292-306. (Year: 2010).*

(Continued)

*Primary Examiner* — Jeffrey A. Smith
*Assistant Examiner* — Brittany E Bargeon
(74) *Attorney, Agent, or Firm* — John W. Branch; Branch Partners PLLC

(57) ABSTRACT

Embodiments are directed towards managing personal inventory over a network. If item information associated with one or more items is provided to an inventory platform, such that the item information includes at least a location and a label identifier. If a request to transfer the one or more items to an off-premises storage station is provided, one or more scheduling options may be provided to an owner of the one or more items; collection instructions may be provided to a distribution organization, such that the collection instructions may be based on a scheduling option selected by the owner, the location of the one or more items, or the like; and if the one or more items may be transferred to the off-premises storage station, the location of the one or more items may be updated to indicate that they are stored at the off-premises storage station.

17 Claims, 18 Drawing Sheets

(51) Int. Cl.
*G06Q 30/06* (2012.01)
*G06F 16/23* (2019.01)

(58) Field of Classification Search
USPC .................................................. 705/26.81
See application file for complete search history.

(56) References Cited

U.S. PATENT DOCUMENTS

| | | | |
|---|---|---|---|
| 7,251,612 B1 | 7/2007 | Parker et al. | |
| 8,682,751 B1 | 3/2014 | Antony | |
| 9,158,944 B2 | 10/2015 | Divringi et al. | |
| 10,796,273 B2 * | 10/2020 | Drayton | G06Q 10/087 |
| 2002/0004703 A1 | 1/2002 | Gaspard, II | |
| 2003/0036935 A1 | 2/2003 | Nel | |
| 2004/0202154 A1 | 10/2004 | Aklepi et al. | |
| 2005/0006470 A1 | 1/2005 | Mrozik et al. | |
| 2005/0072219 A1 | 4/2005 | Nelson et al. | |
| 2006/0111955 A1 | 5/2006 | Winter et al. | |
| 2007/0145973 A1 | 6/2007 | Bertozzi et al. | |
| 2007/0282506 A1 | 12/2007 | Breed et al. | |
| 2008/0114638 A1 | 5/2008 | Colliau et al. | |
| 2008/0160909 A1 * | 7/2008 | Khedouri | G11B 27/034 455/3.06 |
| 2009/0182901 A1 | 7/2009 | Callaghan et al. | |
| 2010/0131530 A1 | 5/2010 | Gibson et al. | |
| 2010/0250446 A1 | 9/2010 | Mackenzie et al. | |
| 2011/0279453 A1 | 11/2011 | Murphy et al. | |
| 2013/0060579 A1 | 3/2013 | Yu et al. | |
| 2013/0211658 A1 | 8/2013 | Bonefas | |
| 2014/0107971 A1 | 4/2014 | Engedal et al. | |
| 2014/0156472 A1 | 6/2014 | Stuntebeck et al. | |
| 2014/0263677 A1 | 9/2014 | Divringi et al. | |
| 2014/0279294 A1 * | 9/2014 | Field-Darragh | G06Q 30/0282 705/28 |
| 2014/0304116 A1 * | 10/2014 | Chan | G06Q 30/06 705/26.62 |
| 2014/0330738 A1 | 11/2014 | Falcone et al. | |
| 2014/0374478 A1 | 12/2014 | Dearing et al. | |
| 2015/0094876 A1 | 4/2015 | Baldwin | |
| 2015/0201001 A1 | 7/2015 | Cabanillas et al. | |
| 2015/0278759 A1 | 10/2015 | Harris et al. | |
| 2015/0347888 A1 | 12/2015 | Divringi et al. | |
| 2016/0029430 A1 | 1/2016 | Mishra et al. | |
| 2016/0042312 A1 | 2/2016 | Siebrecht et al. | |
| 2016/0063734 A1 * | 3/2016 | Divakaran | G06V 10/50 382/110 |
| 2016/0180475 A1 | 6/2016 | Phillips et al. | |
| 2017/0154347 A1 | 6/2017 | Bateman | |

OTHER PUBLICATIONS

Office Communication for U.S. Appl. No. 15/356,326 dated Feb. 14, 2017, pp. 1-17.
Office Communication for U.S. Appl. No. 15/356,326 dated Jun. 30, 2017, pp. 1-28.
Office Communication for U.S. Appl. No. 15/356,326 dated Oct. 2, 2017, pp. 1-4.
Office Communication for U.S. Appl. No. 15/633,671 dated Oct. 10, 2017, pp. 1-25.
Office Communication for U.S. Appl. No. 15/356,326 dated Dec. 27, 2017, pp. 1-36.
Office Communication for U.S. Appl. No. 15/633,671 dated Mar. 9, 2018, pp. 1-26.
Office Communication for U.S. Appl. No. 15/356,326 dated Jul. 27, 2018, pp. 1-31.
Office Communication for U.S. Appl. No. 15/633,671 dated Oct. 11, 2018, pp. 1-27.
Office Communication for U.S. Appl. No. 15/356,326 dated Jan. 28, 2019, pp. 1-6.
Office Communication for U.S. Appl. No. 15/633,671 dated Apr. 19, 2019, pp. 1-32.
Office Communication for U.S. Appl. No. 15/633,671 dated Jul. 8, 2019, pp. 1-7.
Office Communication for U.S. Appl. No. 15/633,671 dated Dec. 23, 2019, pp. 1-25.
Office Communication for U.S. Appl. No. 15/356,326 dated Feb. 10, 2020, pp. 1-20.
Office Communication for U.S. Appl. No. 15/356,326 dated Jun. 23, 2020, pp. 1-8.
Office Communication for U.S. Appl. No. 15/633,671 dated Jun. 26, 2020, pp. 1-29.
Office Communication for U.S. Appl. No. 15/356,326 dated Jul. 21, 2020, pp. 1-12.
Kärkkäinen, Mikko et al., Implementing Inventory Transparency to Temporary Storage Locations: a solution design experiment in project business, 2010, International Journal of Managing Projects in Business, vol. 3 No. 2, 2010, pp. 1-16.
Office Communication for U.S. Appl. No. 15/633,671 dated Sep. 8, 2020, pp. 1-6.
Office Communication for U.S. Appl. No. 15/633,671 dated Oct. 14, 2020, pp. 1-28.
Office Communication for U.S. Appl. No. 15/633,671 dated Sep. 3, 2021, pp. 1-28.

* cited by examiner

METHOD, SYSTEM, AND MEDIA FOR MANAGEMENT AND ORGANIZATION OF PERSONAL PROPERTY

CROSS-REFERENCE TO RELATED APPLICATIONS

This Utility Patent Application is a Continuation of U.S. patent application Ser. No. 15/356,326 filed on Nov. 18, 2016, now U.S. Pat. No. 10,796,273 issued on Oct. 6, 2020, the benefit of the filing date of which is hereby claimed under 35 U.S.C. § 120 and the contents of which is further incorporated in entirety by reference.

TECHNICAL FIELD

This invention relates generally to personal property organization and more particularly, to integrating offsite storage of personal property with local inventory management.

BACKGROUND

Consumers are often confronted with where and/or how to store personal property. Typically, consumers rely on a combination of on-premises storage (e.g., closets, basements, attics, garages, and so on) and off-premises storage (e.g., offsite storage units). In some cases, consumers may prefer on-premises storage because its convenience. Whereas, off-premises storage may be preferred for less used items and/or if on-premises storage is consumed or otherwise unavailable. Further, in some cases, consumers may store some of their personal property at second homes or recreational properties. Also, as urban residences become more expensive affordability may be improved by providing smaller dwellings. However, smaller dwellings may be likely to have less room for storing personal property. Accordingly, it may be common for consumers to have their personal property stored across various locations which may make it more difficult to remember where items are located. Also, accessing items stored off-premises may be inconvenient. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
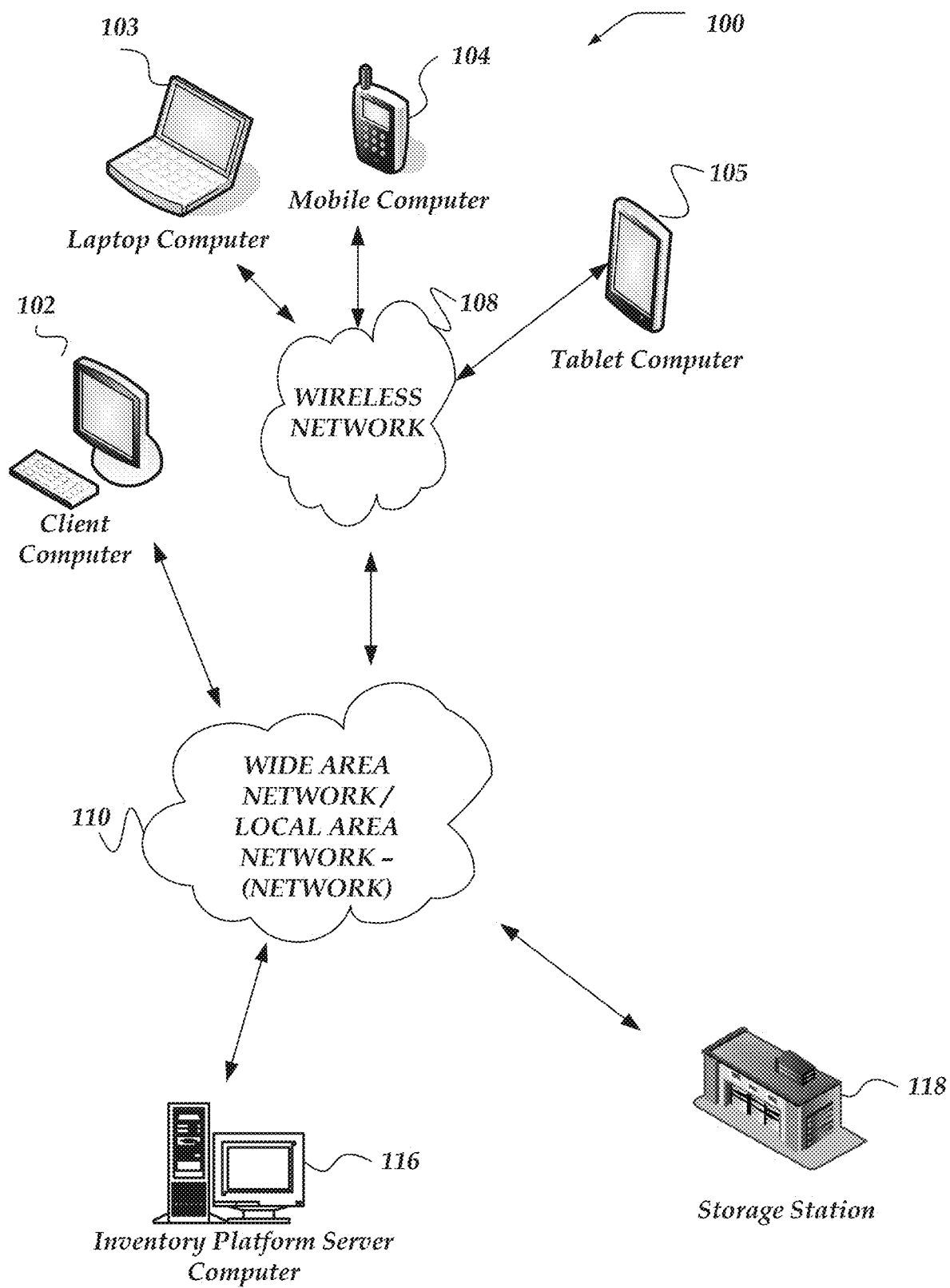
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein, the terms "inventory information," item information" refer to information used to describe one or more characteristics of items management by an inventory platform. Item information may include, information such as, item location, item name, item description, height, weight, width volume, type of item, value, digital media (e.g., digital photographs, videos, audio, or the like), model, make, manufacturer, owner, color, or the like. Likewise, in some embodiments, item information may include indicators that the item may available for sale, rent, trade, sharing, borrowing, donation, or the like.

As used herein, the terms "off-premises storage station," or "off-site storage location" refers to a storage location that is separate from a residence or other location associated with the owner of the items. Off-premises storage stations may also be separate from the inventory platform. In some cases, storage stations may be owned and/or operated by the inventory platform owner. In other cases, storage stations may be owned/operated by third-parties that may provide storage services to the inventory platform operator As used herein, the term "distribution organization" refers to an organization that is capable of acting on pickup (e.g., collection) and delivery instructions for transferring items from one location to another. In some cases, distribution organizations may be owned and/or operated by the operators of the inventory platform. In other cases, distribution organizations may be owned and/or operated by contracted operators.

As used herein, the term "scheduling option" refers to at least a defined delivery or pickup time window. In some cases, scheduling options may include date, time of day, range of time, delivery location, pickup location, or the like.

As used herein, the term "collection instructions" refers to instructions provided to a delivery organization that enables them to collect/pickup items and deliver them to a storage station or another location.

As used herein, the term "delivery instructions" refers to instructions provided to a delivery organization that enables them to collect/pickup items from a storage station or other party and deliver them to a user at another location.

As used herein, the term "distribution instructions" refers to both collection instructions and/or delivery instructions that may be provided to a distribution organization by the inventory platform.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing an inventory of items over a network. In one or more of the various embodiments, if item information associated with one or more items is provided to an inventory platform, a memory may be configured and arranged to store the item information, such that the item information includes at least a location and a label identifier.

In one or more of the various embodiments, if a request to transfer the one or more items at a current location of the one or more items to an off-premises storage location may be provided, one or more scheduling options to collect the one or more items may be provided to an owner of the one or more items; collection instructions may be provided to a distribution organization, such that the collection instructions may be based on a scheduling option selected by the owner, the current location of the one or more items, or the like; and if the one or more items may be transferred to the off-premises storage location, the current location of the one or more items may be updated to indicate that they are stored at the off-premises storage location.

In one or more of the various embodiments, one or more versions of one or more portions of the item information may be provided, such that the one or more versions may be optimized based one or more characteristics of one or more client computers.

In one or more of the various embodiments, if a quality of the network exceeds one or more threshold values, a client computer may be employed to provide the item information over the network.

In one or more of the various embodiments, at least a portion of the item information associated with the one or more items may be provided to an online marketplace. In some embodiments, if the online marketplace indicates that the one or more items are purchased by a user, instructions may be provided to the distribution organization to transfer the one or more items to the user.

In one or more of the various embodiments, an authentication key associated with one or more label identifiers may be provided. In some embodiments, one or more label identifiers may be authenticated based on the authentication key. And, in one or more of the various embodiments, the one or more label identifiers may be associated with the owner.

In one or more of the various embodiments, candidate item information may be provided to the owner based on one or more characteristics of the one or more items.

In one or more of the various embodiments, additional item information may be provided to the inventory platform to indicate that the owner may be offering one or more of sharing the one or more items, renting the one or more items, donating the one or more items, bartering the one or more items, buying the one or more items, or the like.

In one or more of the various embodiments, if a request to transfer one or more other items from the off-site storage location to the owner's location is provided: one or more delivery schedule options may be provided to the owner of the one or more other items; delivery instructions may be provided to the distribution organization, such that the delivery instructions may be based on a delivery schedule option selected by the owner and the location of the owner; and if the one or more other items are transferred to the owner's location, a location of the one or more other items may be updated to indicate that they are stored at the owner's location.

In one or more of the various embodiments, a list of vendors where the owner may obtain labels or labeled containers may be provided, wherein the list of vendors may be based on the location of the owner, promotional agreements with the vendor, or the like.

Illustrated Operating Environment

FIG. 1 shows components of one embodiment of an environment in which embodiments of the invention may be practiced. Not all the components may be required to practice the invention, and variations in the arrangement and type of the components may be made without departing from the spirit or scope of the invention. As shown, system 100 of FIG. 1 includes local area networks (LANs)/wide area networks (WANs)–(network) 110, wireless network 108, client computers 102-105, Inventory Platform Server Computer 116, one or more physical storage stations 118, or the like. In some embodiments, a storage station server computer (not shown) may be located at storage station 118. In other embodiments, users/operators at a storage station may employ one or more client computers, including mobile computers, smartphone, tablet computer, laptop computers, desktop computers, or the like, or combination thereof.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), universally unique identifiers (UUIDs), or other device identifiers. Such information may be provided in a network packet, or the like, sent between other client computers, inventory platform server computer 116, or other computers.

Client computers 102-105 may further be configured to include a client application that enables an end-user to log into an end-user account that may be managed by another computer, such as inventory platform server computer 116, or the like. Such an end-user account, in one non-limiting example, may be configured to enable the end-user to manage one or more online activities, including in one non-limiting example, project management, software development, system administration, inventory management, search activities, social networking activities, browse various websites, communicate with other users, or the like. Further, client computers may be arranged to enable users to provide inventory information, label information, or the like, to inventory platform server computer 116, or the like. Also, client computers may be arranged to enable users to display reports, interactive user-interfaces, and/or results provided by inventory platform server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, inventory platform server computer 116, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of inventory platform server computer 116 is described in more detail below in conjunction with FIG. 3. Briefly, however, inventory platform server computer 116 includes virtually any network computer arranged to provide inventory management services for user as described herein.

Although FIG. 1 illustrates inventory platform server computer 116 as a single computer, the innovations and/or embodiments are not so limited. For example, one or more functions of inventory platform server computer 116, or the like, may be distributed across one or more distinct network computers. Moreover, inventory platform server computer 116 are not limited to a particular configuration such as the one shown in FIG. 1. Thus, in one embodiment, inventory platform server computer 116 may be implemented using a plurality of network computers. In other embodiments, server computers may be implemented using a plurality of network computers in a cluster architecture, a peer-to-peer architecture, or the like. Further, in at least one of the various embodiments, inventory platform server computer 116 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
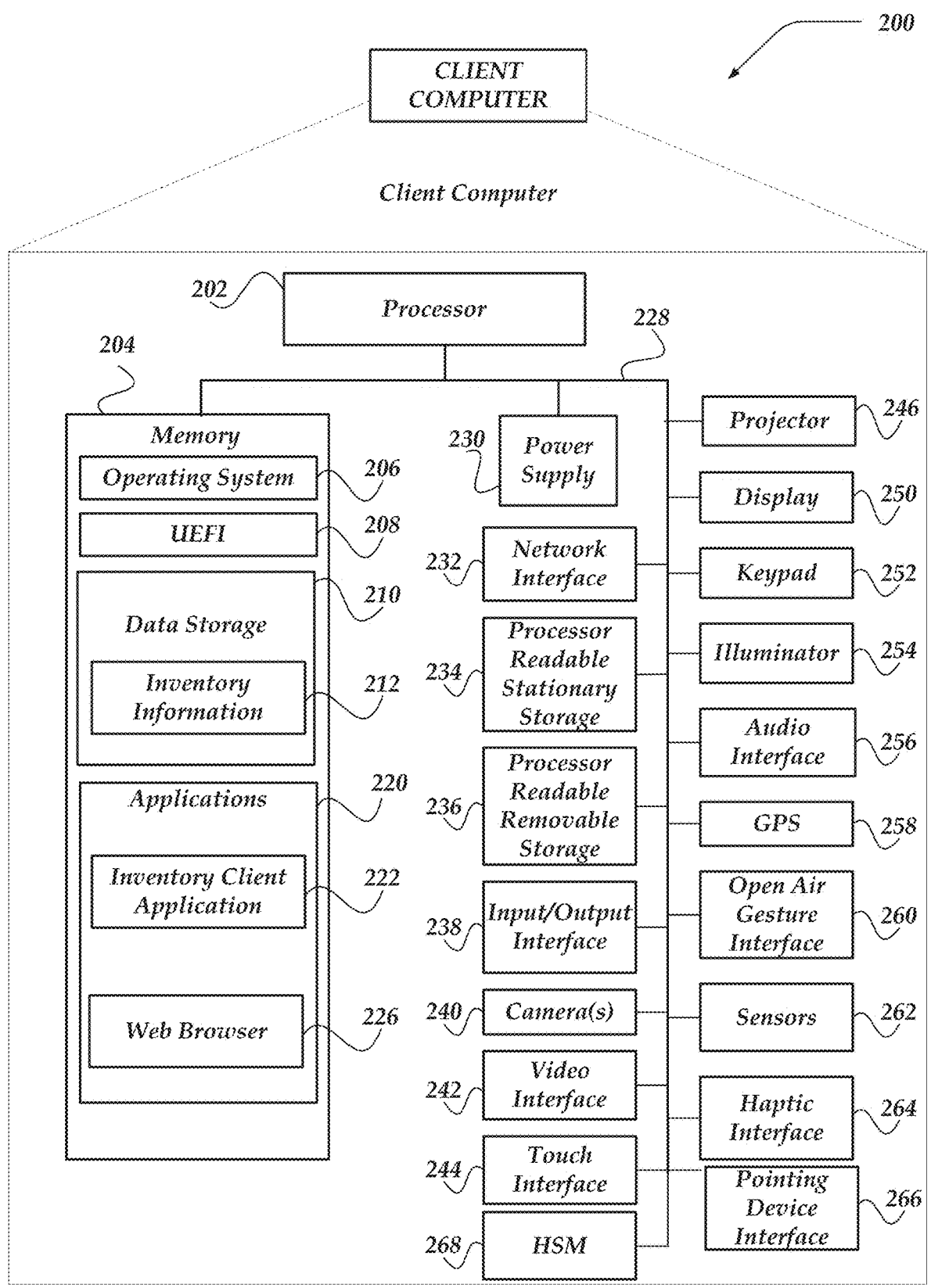
FIG. 2 shows a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer.

Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

In at least one of the various embodiments, applications, such as, flow execution engine 222, web browser 226, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 258. Also, in some embodiments, geolocation information may include information provided using one or more geolocation protocols over the networks, such as, wireless network 108 and/or network 111.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store Unified Extensible Firmware Interface (UEFI) 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™. The operating system may include, or interface with a Java and/or JavaScript virtual machine modules that enable control of hardware components and/or operating system operations via Java application programs or JavaScript programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In some embodiments, data storage 210 may include inventory information 212 for locally storing inventory information. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, inventory client application 222. In at least one of the various embodiments, inventory client application 222 may be used to interact with an inventory platform.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. Also, in one or more embodiments (not shown in the figures), the client computer may include one or more hardware microcontrollers instead of one or more CPUs. In at least one embodiment, the microcontrollers be system-on-a-chips (SOCs) that may directly execute their own embedded logic to perform actions and access their own internal memory and their own external Input and Output Interfaces (e.g., hardware pins and/or wireless transceivers) to perform actions.

Illustrative Network Computer

Figure 3:
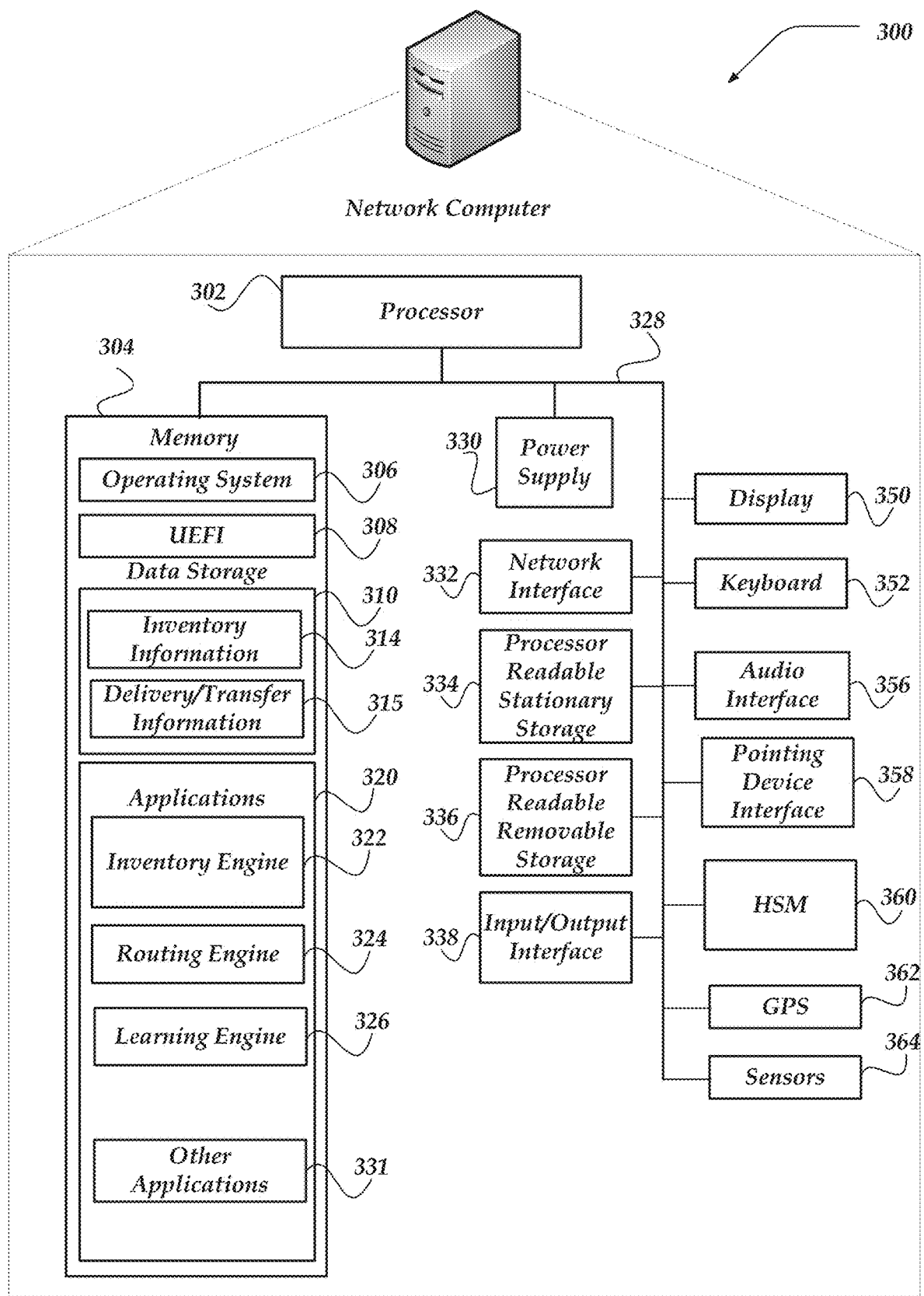
FIG. 3 illustrates a schematic embodiment of a network computer.

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of inventory platform server computer 116, or, in some embodiments, one or more network computers located at storage station 118 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300. In some embodiments, processor 302 may be a multiprocessor system that includes one or more processors each having one or more processing/execution cores.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of non-transitory computer readable and/or writeable media. Memory 304 illustrates an example of computer-readable storage media (devices) for storage of information such as computer-readable instructions, data structures, program modules or other data. Memory 304 stores a unified extensible firmware interface (UEFI) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, inventory information 314, delivery/transfer information 315, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include inventory engine 322, routing engine 324, other applications 331, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, inventory engine 322, routing engine 324, other applications 331, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 362. Also, in some embodiments, geolocation information may include information provided using one or more geolocation protocols over the networks, such as, wireless network 108 and/or network 111.

Furthermore, in at least one of the various embodiments, inventory engine 322, routing engine 324, or other applications 331, may be operative in a cloud-based computing environment. In at least one of the various embodiments, these engines, and others, that comprise the modeling platform that may be executing within virtual machines and/or virtual servers that may be managed in a cloud-based based computing environment. In at least one of the various embodiments, in this context applications including the engines may flow from one physical network computer within the cloud-based environment to another depending on performance and scaling considerations automatically managed by the cloud computing environment. Likewise, in at least one of the various embodiments, virtual machines and/or virtual servers dedicated to inventory engine 322, routing engine 324, learning engine 326, or other applications 331, may be provisioned and de-commissioned automatically.

Further, in some embodiments, network computer 300 may also include hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include an one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In at least one embodiment, the one or more microcontrollers may directly execute embedded logic to perform actions and access their own internal memory and their own external Input and Output Interfaces (e.g., hardware pins and/or wireless transceivers) to perform actions. E.g., they may be arranged as Systems On Chips (SOCs).

Illustrative Logical System Architecture

Figure 4:
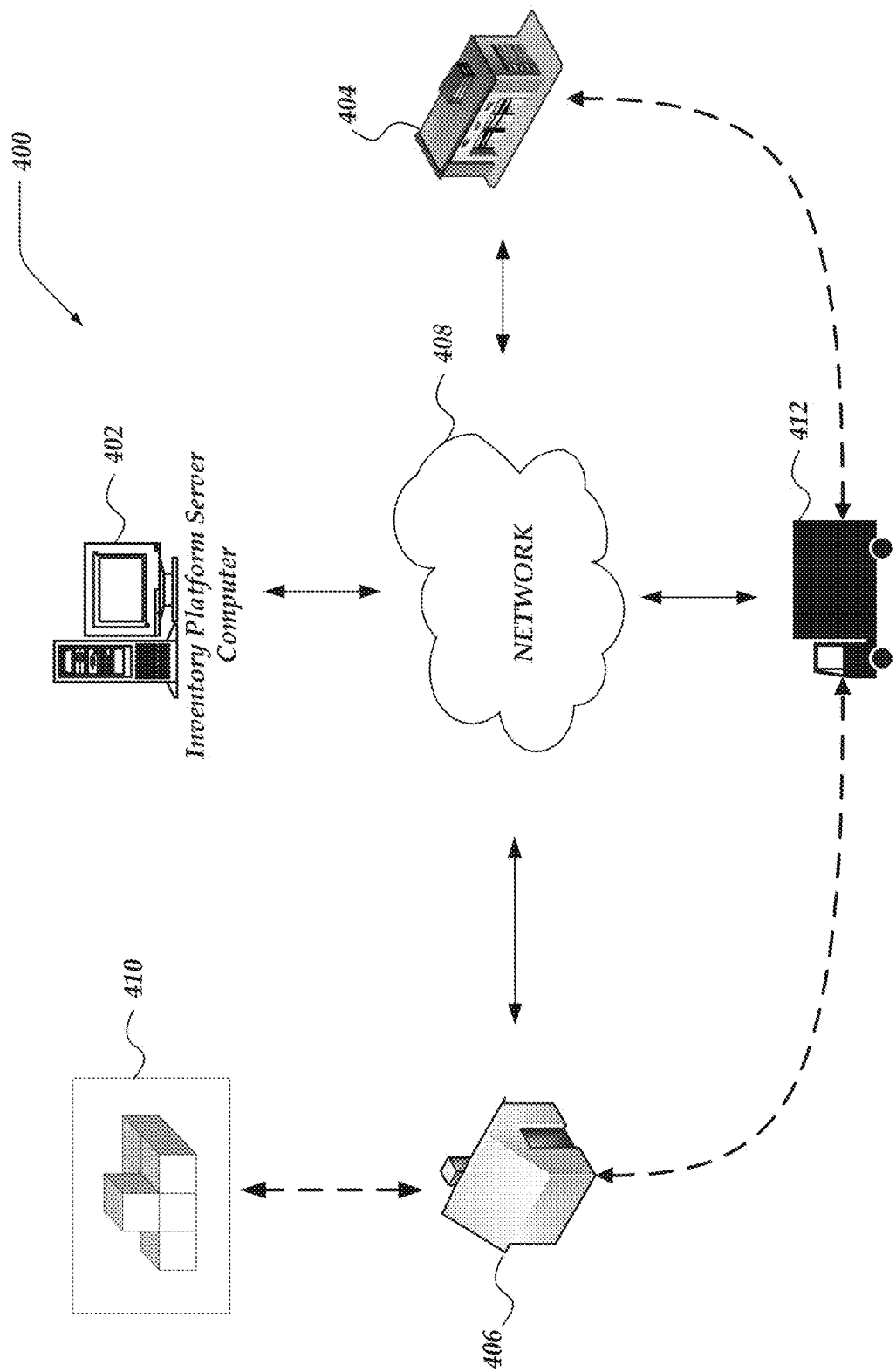
FIG. 4 shows a logical schematic of a portion of inventory system 400 arranged to manage and organize personal inventory in accordance with at least one of the various embodiments.

FIG. 4 shows a logical schematic of a portion of inventory system 400 arranged to manage and organize personal inventory in accordance with at least one of the various embodiments. In one or more of the various embodiments, inventory platform server computer 402, storage station 404, residence 406, local property storage 410, and distribution organization 412 may be arranged to be communicatively coupled using one or more networks, such as network 408.

In one or more of the various embodiments, a user at residence 406 may use an inventory client application, such as, inventory client application 222 to provide inventory information to an inventory engine, such as inventory engine 322 that may be hosted on inventory platform server computer 402. Accordingly, in one or more of the various embodiments, inventory engine 322 may be arranged to store the inventory information on inventory platform server computer 402.

In one or more of the various embodiments, the user may indicate that one or more portions of their personal property should be stored an off-premises storage site. Accordingly, in one or more of the various embodiments, an inventory engine may be arranged to communicate with an off-site storage station, such as storage station 404, and a distribution organization, such as distribution organization 412 to arrange for the one or more portions of their personal property to be transferred to storage station 404.

In one or more of the various embodiments, inventory information associated with the user's personal property may be arranged to include various characteristics of the property. In some embodiments, these characteristics may include, name, category, description, photographs, height, width, weight, owner (e.g., which family member owns the item, or the like), storage location, or the like. In one or more of the various embodiments, inventory information may be associated with items using identifiers affixed (e.g., bar codes, QR codes, serial numbers, or the like) or included (e.g., RFID, NFC, beacons, or the like) to labels that are attached to the items. In some embodiments, these labels may be attached to a container (e.g., a box) where the item is placed.

Accordingly, in one or more of the various embodiments, the user may review their personal inventory using an inventory client application. In some embodiments, the inventory platform may provide a report that shows a list of the user's items that included some or all the characteristic as well as the location where the item is stored.

In one or more of the various embodiments, if the item is stored in local storage, such as local storage 410, the reported locations may be the location in residence 406 where the item was stored. For example, in some embodiments, location may be reported as, attic, basement, kitchen, garage, tool shed, Joe's room, or the like. Likewise, in one or more of the various embodiments, if the item is stored at an off-premises storage station, such as storage station 404, the item report may show that the location of the is off-site.

In one or more of the various embodiments, if a user designates that items should be stored off-site, the inventory platform may provide scheduling options including one or more available collection slots. Accordingly, the user may select a slot that defines a time window for the item to be picked up. Next, in one or more of the various embodiments, the inventory platform may employ a routing engine to provide collection instructions that may include a delivery route and schedule to distribution organization 412. In one or more of the various embodiments, distribution organization 412 may then collect the items at residence 406 and transfer them to storage station 404.

Likewise, in one or more of the various embodiments, a user may request to retrieve items from off-premises storage. Accordingly, in some embodiments, the user may employ an inventory client application to submit a request for the item to be retrieved from off-premise storage and delivered to their residence. In one or more of the various embodiments, the request may include delivery schedule options, such as a requested time-window for receiving the delivery.

Next, in one or more of the various embodiments, the inventory platform may employ the inventory engine to locate the requested items and employ the routing engine to provide delivery instructions that may include a route and schedule for delivery of the requested items.

Figure 5:
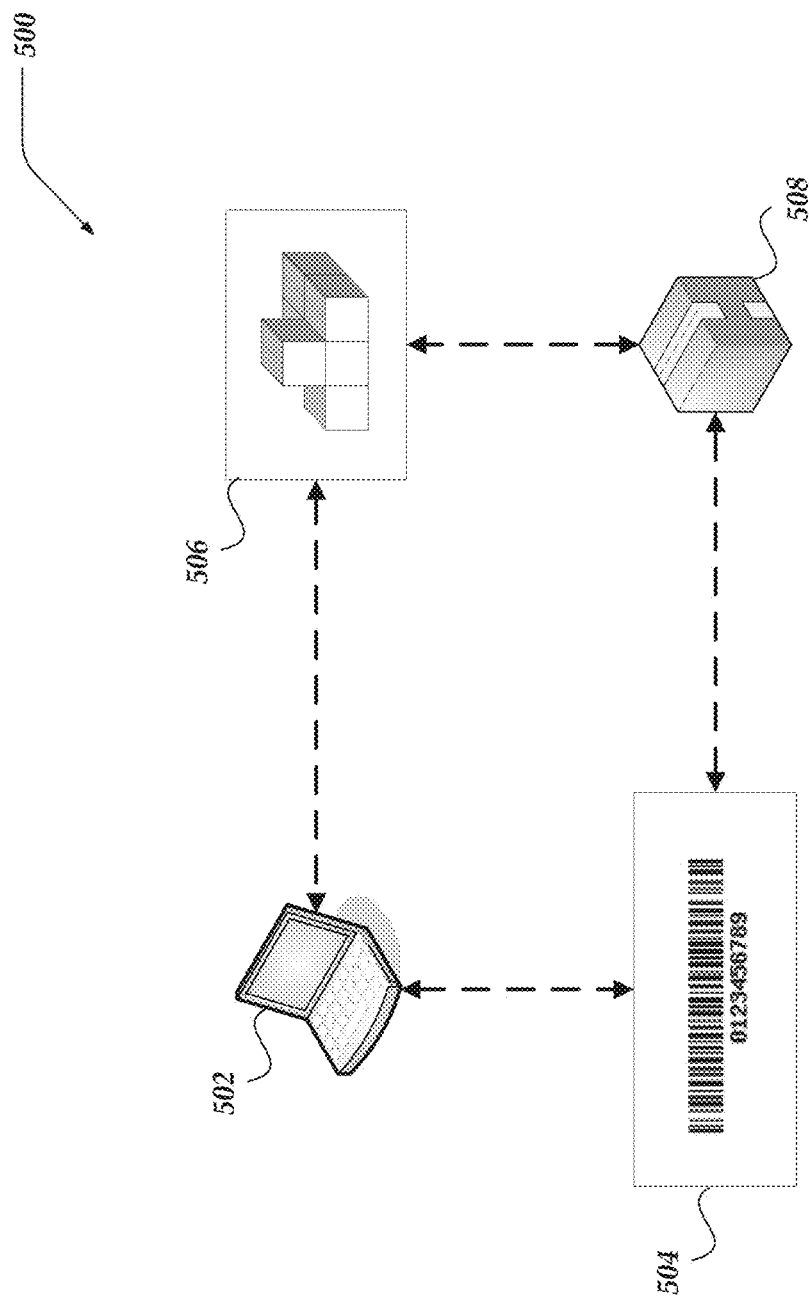
FIG. 5 shows a logical illustration of a system for associating labels with items in accordance with one or more of the various embodiments.

FIG. 5 shows a logical illustration of system 500 for associating labels with items in accordance with one or more of the various embodiments. In one or more of the various embodiments, a label affixed to user items (or affixed to a container for items) may be used for maintaining inventory control over user personal property items. In some embodiments, a label such as label 504 may be associated with a user via client computer 502. Likewise, label 504 may be associated with personal property item 508. Inventory information may be associated with label 504 and stored on an inventory platform server. As described above, inventory information may include location information. Accordingly, if personal property item 508 is stored at an inventory location, such as inventory location 506, location information associated with the property may be updated and associated with label 504.

Figure 6:
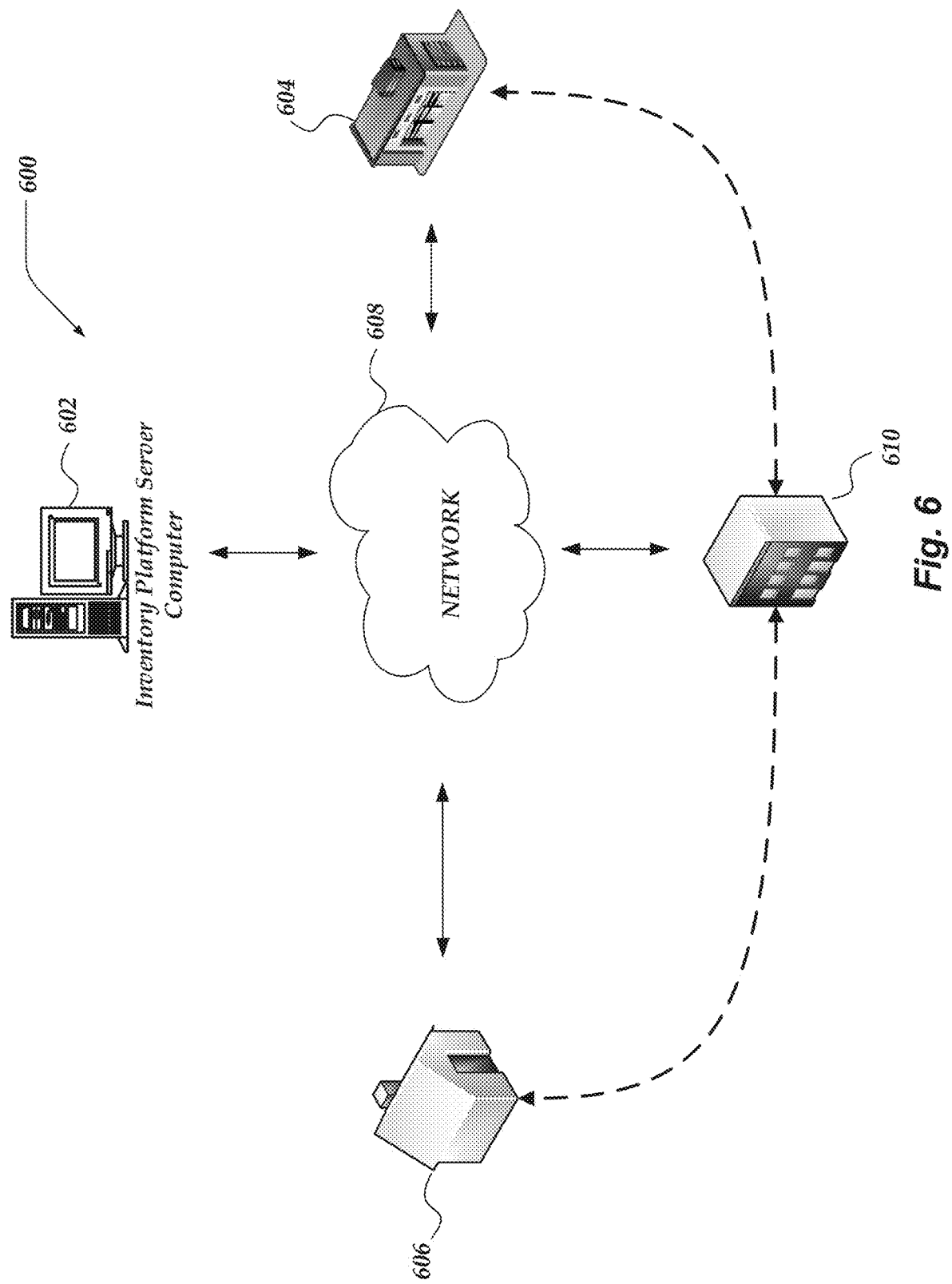
FIG. 6 illustrates a logical architecture of a system for transferring personal property to a third party in accordance with in one or more of the various embodiments.

FIG. 6 illustrates a logical architecture of system 600 for transferring personal property to a third party in accordance with in one or more of the various embodiments. In one or more of the various embodiments, an inventory platform may be arranged to enable users to transfer one or more personal property items to another person or to an organization. In some embodiments, users may employ the inventory platform to sell, trade, share, rent, or barter items to other users. Also, in some embodiments, users may employ the inventory platform to donate personal property items to various charities of their choice.

In one or more of the various embodiments, inventory platform server computer 602, storage station 604, residence 606, third-party location 610, or the like, may be arranged to communicate over network 608. In some embodiments, network 608 may be similar to network 108 and/or network 110.

In one or more of the various embodiments, a user at residence 606 may review their personal property inventory using an inventory client application, such as inventory client application 222. Accordingly, in some embodiments, the user may be provided an inventory catalog that includes a searchable list of personal property items being managed by the inventory platform.

In one or more of the various embodiments, the user may select one or more items from their list of items and indicate that they would like to transfer the selected items to a third-party. Accordingly, the inventory platform may be arranged to lookup the item information associated with the selected items to determine their location, size, type of item, or the like.

In one or more of the various embodiments, if one or more of the selected items are stored at a storage station, such as storage station 604 the inventory platform may employ a routing engine, such as routing engine 324 to plan a route and delivery schedule to transfer the selected items from storage station 604 to the third-parties desired location, such as third-party location 610.

In one or more of the various embodiments, if one or more of the selected property items are stored at residence 606, the inventory platform may be arranged to employ the routing engine to provide a route and collection schedule to collect those items from residence 606 and transfer them to the third-party.

In one or more of the various embodiments, if one or more selected items are located at residence 606, the inventory platform may provide a selection of collection times that the user may select from. Likewise, in some embodiments, if the third-party requests the items to be delivered to their location (e.g., third-party location 610), the inventory platform may be arranged to provide a set of available delivery times.

In one or more of the various embodiments, if all of the items being transferred are located at a storage station rather at the user's residence, the inventory platform may schedule delivery to the third-party absent collection times provided from the transferring user since they are unnecessary. Likewise, in some embodiments, if the third-party requests that the items be transferred directly to a storage station, the inventory platform may be arranged to schedule collection of the items absent input from the third-party.

In one or more of the various embodiments, if the items selected for transfer may be located at a storage station and the third-party may request that they should remain stored at a storage station, the inventory platform may make the transfer by associating the items with third-party absent collection or delivery.

In one or more of the various embodiments, the inventory platform may be arranged to enable users to offer one or more personal property items for sale. In one or more of the various embodiments, the inventory platform may be arranged to integrate with one or more online marketplaces such as, auction platforms, reverse auction platforms, online classified advertisement platforms, online storefront/ecommerce platforms, or the like, or combination thereof. Accordingly, in some embodiments, if a third-party accepts the user's offer, the online marketplace may provide the relevant sales information to the inventory platform. In some embodiments, the inventory platform may then perform actions to arrange for the collection and/or delivery of the items as required.

In one or more of the various embodiments, one or more online marketplaces may be preferentially filtered/selected/displayed based on user preferences, location, item type (e.g., online marketplace preferences), item value, number of items, promotional activity, surcharge pricing, collection/delivery demands, or the like.

In one or more of the various embodiments, users may select one or more preferred online marketplaces. Accordingly, in some embodiments, the preferred online marketplaces may be given preferential display/treatment if presented to the user in one or more inventory platforms user-interfaces.

In one or more of the various embodiments, if a user designates one or more items for donation to a charity, the inventory platform may provide a list available charities that may be displayed to the user. In one or more of the various embodiments, the list of charities may be filtered/selected/displayed based on user preferences, location, item values, number of items, item type (e.g., charity preferences), promotional activity, surcharge pricing, collection/delivery demands, or the like.

In one or more of the various embodiments, the inventory platform may be arranged to enable users to select one or more favorite or preferred charities. Accordingly, these charities may be presented at the top of the list or otherwise highlighted if displayed in the inventory client application.

In one or more of the various embodiments, participating charities may register with the inventory platform. Accordingly, in some embodiments, the inventory platform may enable the charities to provide various preference information, including the type of items they may be will to accept. For example, in some embodiments, whether a charity accepts donated electronics but refuses clothing it may be indicated using charity preferences stored by the inventory platform.

In some embodiments, charities may set one or more threshold values that limit the number of items accepted for given type of items over a provided time window. For example, in some embodiments, a charity may prefer to accept a limited number of donated appliances in each time-window.

In one or more of the various embodiments, one or more charities may be participating in active promotions that may enable them to highlighted or otherwise received preferential treatment. In some cases, the charity may pay to enable the preferential treatment. In other cases, another third-party organization may pay to enable the preferential treatment. For example, national umbrella organizations may pay fees to (if any) to promote a class of local charities. Likewise, in some embodiments, third-party organizations may pay to promote the donation of certain types of items. Thus, in this example, charities that accept those types of item may be promoted or otherwise receive preferential treatment if provided to users.

Also, in one or more of the various embodiments, if users, charities, or online marketplaces have limited flexibility in scheduling collection and/or delivery of items, these limitations may be considered by the inventory platform if selecting charities or online marketplaces to present to users.

In one or more of the various embodiments, one or more charities or online marketplaces may provide their own pickup or delivery services. Accordingly, in some embodiments, the inventory platform may be arranged to request collection/delivery schedule information from charities or online marketplaces.

Further, in one or more of the various embodiments, the inventory platform may be arranged to collect items at one or more storage stations and then notify appropriate online marketplaces or charities that the items are available for collection at the storage station.

In one or more of the various embodiments, inventory platforms may be arranged to enable users to donate, share, rent, barter, or borrow items. Accordingly, in some embodiments, the inventory platform may be arranged to enable users to provide item information that indicates one or more items may be offered for donation, sharing, renting, borrowing, bartering or the like, or combination thereof. In one or more of the various embodiments, one or more prospective terms of a transfer agreement (e.g., rental agreement, sharing agreement, barter terms, or the like) may be predefined by the user before offers are received. For example, in some embodiments, a user may set the price, available rental durations, deposit amounts, blackout dates, or the like.

In one or more of the various embodiments, sharing may be similar to renting in that the items are offered to other third-parties but generally there a rental fee may by absent. In some embodiments, sharing may be considered similar to renting except rent fee may not be required.

In one or more of the various embodiments, a user may select one or more items and provide item information that marks them as shareable. Likewise, in some embodiments, the user may select one or more other persons to provide viewing access to some or all of their shared items. For example, in some embodiments, a user may enable one or more friends or family members to view/browse their some or all of their shared items. Accordingly, in one or more of the various embodiments, if an allowed user indicates that they would like to use one or more of the shared item, the inventory platform may arrange for collection of the shared items from the owner and delivery of the shared items to the borrower. Likewise, if the sharing may be finished, the inventory platform may arrange for collection of the shared items from the borrower and delivery to return the items to the owner. Note, in some embodiments, if the owner is storing the items at an off-premises storage station, the distribution organization may collect the shared items from the borrower and return them to the storage station.

Also, in one or more of the various embodiments, rented items may be handled similarly except that the inventory platform may collect rental fees from the borrowers. Also, in some embodiments, the inventory platform may collect surcharge fee and/or handling fees from either the renter, owner, share, borrower, or the like, or combination thereof.

In one or more of the various embodiments, the inventory platform may be arranged to enable a user to offer items for renting, sharing, trading, bartering, sale, or the like, by sending email to one or more persons. Also, in one or more of the various embodiments, social media communication features may also be used to selectively communicate offer information to one or more persons. For example, offer information may be shared by a user to one or more of their social media friends or social groups.

In one or more of the various embodiments, if a user is interested in buying, renting, sharing, borrowing particular items or item types, they may register their interest with the inventory platform. In one or more of the various embodiments, interest registration may include item information describing the kind of items that the user may be interested in. For example, a user may provide prices ranges, features, makes, models, size, or the like, that may be used to filter available items so the inventory platform may identify items that may interest the user.

In one or more of the various embodiments, the inventory platform may be enable analyze market information and determine comparative pricing information for offered items. Accordingly, the inventory platform may recommend prices for sale or rent of items based on its analysis of the market for the items.

Also, in one or more of the various embodiments, the inventory platform may be arranged to automatically share pricing information to users even if their qualifying/matching items are excluded from sales or renting. Accordingly, in some embodiments, the inventory platform may be arranged to show users market information for items they have not marked as saleable or rentable. In some embodiments, the market information may include various market data, such as number of items available, number of items sold with a time period, price ranges, price ranges for similar items, or the like, or combination thereof.

Generalized Operations

FIGS. 7-18 represent the generalized operations for management and organization of personal inventory in accordance with at least one of the various embodiments. In one or more of the various embodiments, processes 700, 800, 900, 1000, 1100, 1200, 1300, 1400, 1500, 1600, 1700, and 1800 described in conjunction with FIGS. 7-18 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, one or more of the various embodiments, the processes described in conjunction with FIGS. 7-18 may be operative in management and organization of personal inventory such as described in conjunction with FIGS. 4-6.

Figure 7:
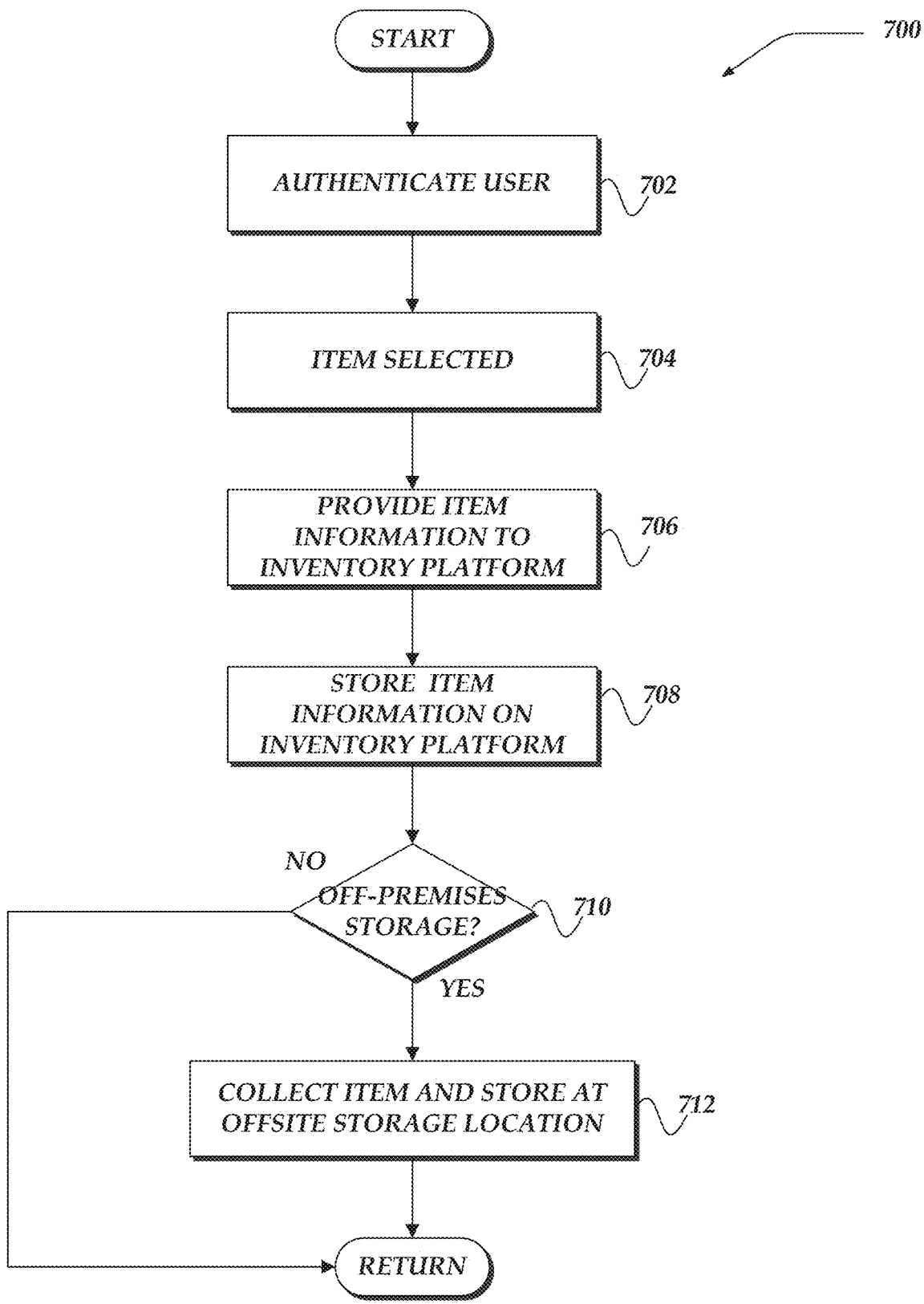
FIG. 7 illustrates an overview flowchart for a process for management and organization of personal inventory in accordance with one or more of the various embodiments.

FIG. 7 illustrates an overview flowchart for process 700 for management and organization of personal inventory in accordance with one or more of the various embodiments. After a start block, at block 702, in one or more of the various embodiments, a user may be authenticated by the inventory platform. In one or more of the various embodiments, the user may be enabled to provide various credentials to authenticate with the inventory platform. In one or more of the various embodiments, the credentials may include, usernames, passwords, biometric information (e.g., fingerprints, voice prints, retinal information, or the like), pin numbers, cryptographic certificates, device information/identities, or the like, or combination thereof.

In one or more of the various embodiments, the inventory platform may authenticate the user based on their credentials. Accordingly, in some embodiments, access to one or more features of the inventory platform may be provided to the user based on their access permissions.

In one or more of the various embodiments, the inventory platform may be arranged to authenticate users by employing one or more external services. In some embodiments, the inventory platform may be configured to employ authentication services offered by one or more social media platforms to authenticate users. For example, in some embodiments, the inventory platform may be arranged to employ an open standard for authorization (OAuth) to authenticate a user by way of one or more of their social media accounts.

At block 704, in one or more of the various embodiments, the authenticated user may select one or more personal property items for adding to their inventory catalog. In one or more of the various embodiments, users may select from items they have in their possession. In some embodiments, users may select items as they are purchased if the vendor may be integrated with the inventory platform.

At block 706, in one or more of the various embodiments, the user may provide item information to an inventory platform. In one or more of the various embodiments, the user may provide item information describing the item. This information may be used by the inventory platform for indexing, cataloging, load planning, valuation, storage space estimates, or the like. In one or more of the various embodiments, item information may include digital media, such as photographs, videos, audio, or the like, or combination thereof.

In one or more of the various embodiments, the inventory platform may provide pre-selected options that a user may select from to compile the item information. In some embodiments, an inventory client application may be arranged to provide the item information to the inventory platform server computer over a network.

In one or more of the various embodiments, the inventory client application and/or the inventory platform may be arranged to accept voice commands in lieu of other inputs, such as keyboard, touch, or the like. Accordingly, in some embodiments, some or all of the item information may be provided using voice commands accepted by the inventory client application.

At block 708, in one or more of the various embodiments, the item information may be stored by the inventory platform. In one or more of the various embodiments, upon receiving the item information, the inventory platform may index and store the item information. In some embodiments, the item information may be compiled into an inventory catalog and associated with the user and/or the users authentication credentials. The user may be considered an owner of the items.

At decision block 710, in one or more of the various embodiments, if the items are to be stored off-premises, control may flow to block 712; otherwise, control may be returned to a calling process. In one or more of the various embodiments, users may indicate that one or more of their items should be stored off-premises. Also, in some embodiments, a user may use the inventory client application to select items from their inventory catalog and request that they be stored off-premises rather than kept at their residence or location. Note, in some embodiments, a user will generally be disabled from seeing or viewing items belonging to other users unless the items have been deliberately shared by their owner. For example, another person may indicate that some or all of their items are shared with someone else. Accordingly, in this example, the person the items are shared with may be enabled to view and/or interact with the shared items based on the privileges assigned to them by the owner of the items.

At block 712, in one or more of the various embodiments, the inventory platform may be arranged to collect the items and store them at an off-premise storage location. In one or more of the various embodiments, the inventory platform may be arranged to provide scheduling options to the user. Likewise, in some embodiments, the inventory platform may be arranged to provide collection instructions to a distribution organization so they can collect the items and bring them to a storage location, such as a storage station. Next, in some embodiments, control may be returned to a calling process.

Figure 8:
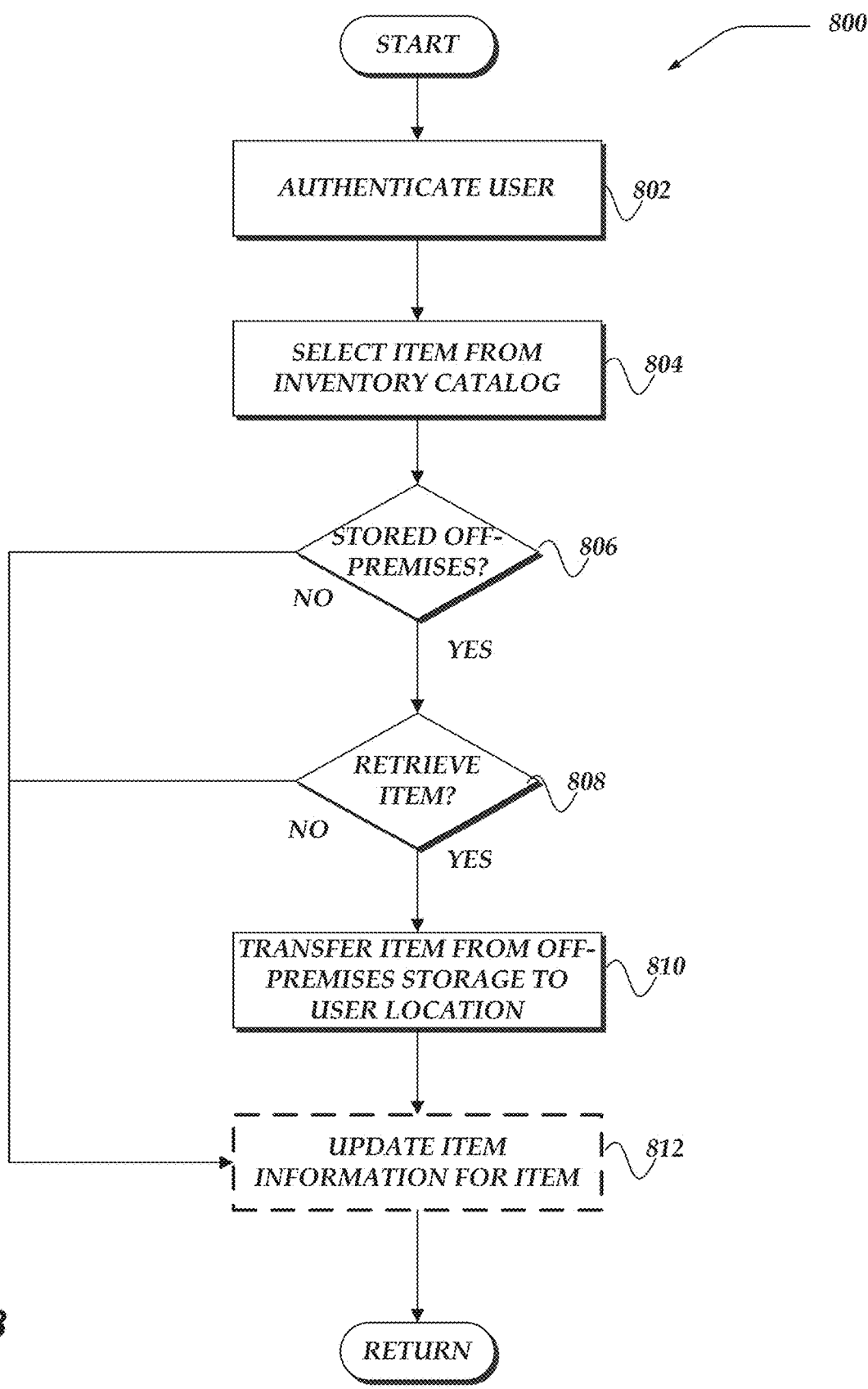
FIG. 8 illustrates an overview flowchart for a process for management and organization of personal inventory in accordance with one or more of the various embodiments.

FIG. 8 illustrates an overview flowchart for process 800 for management and organization of personal inventory in accordance with one or more of the various embodiments. After a start block, at block 802, in one or more of the various embodiments, a user may be authenticated by the inventory platform. In one or more of the various embodiments, the user may be enabled to provide various credentials to authenticate with the inventory platform. In one or more of the various embodiments, the credentials may include, usernames, passwords, biometric information (e.g., fingerprints, voice prints, retinal information, or the like), pin numbers, cryptographic certificates, device information/identities, or the like, or combination thereof.

In one or more of the various embodiments, the inventory platform may authenticate the user based on their credentials. Accordingly, in some embodiments, access to one or more features of the inventory platform may be provided to the user based on their access permissions.

In one or more of the various embodiments, the inventory platform may be arranged to authenticate users by employing one or more external services. In some embodiments, the inventory platform may be configured to employ authentication services offered by one or more social media platforms to authenticate users. For example, in some embodiments, the inventory platform may be arranged to employ an open standard for authorization (OAuth) to authenticate a user by way of one or more of their social media accounts.

At block 804, in one or more of the various embodiments, the authenticated user may select one or more items from their inventory catalog. In one or more of the various embodiments, the inventory platform may provide the inventory catalog to an inventory client application running on a client computer. In some embodiments, the inventory client application may be a web application running in a web browser. In other embodiments, the inventory client application may be native application running on a client computer, such as, a mobile computer, tablet computer, smart phone, or the like.

In one or more of the various embodiments, the inventory catalog may be arranged to be searched and/or browsed by the user so they may identify items and review the corresponding item information. Accordingly, in one or more of the various embodiments, the user may select items for: retrieval from off-premises storage; update item information for selected items; or the like.

In one or more of the various embodiments, the inventory client application and/or the inventory platform may be arranged to accept voice commands in lieu of other inputs, such as keyboard, touch, or the like.

At decision block 806, in one or more of the various embodiments, if the one or more items are stored off-premises, control may flow to decision block 808; otherwise, control may flow to block 812. In one or more of the various embodiments, item information may include location information for each item. Accordingly, in some embodiments, the inventory platform may recognize if items may be stored off-premises.

At decision block 808, in one or more of the various embodiments, if the user requests to retrieve the item from off-premises storage, control may flow to block 810; otherwise, control may flow to block 812.

At block 810, in one or more of the various embodiments, the inventory platform may be arranged to perform actions to transfer the items from off-premises storage to user location. In one or more of the various embodiments, as described above, the inventory platform may be arranged to offer delivery scheduling options to the user and provide delivery instructions to a distribution organization.

In one or more of the various embodiments, delivery instructions may be provided by a routing engine, such as routing engine 324. In one or more of the various embodiments, the routing engine may provide delivery instructions that may include a distribution route/path that may include additional items for other users.

At block 812, in one or more of the various embodiments, optionally, the item information associated with the one or more items may be updated. In one or more of the various embodiments, the user as modified the item information for one or more of their items, the inventory platform may be arranged to store the modified information. In one or more of the various embodiments, modified information may include that the item is out for delivery, delivered, or the like.

This block is considered optional because in some cases the user may not have taken actions that require updating the item information. Next, control may be returned to a calling process.

Figure 9:
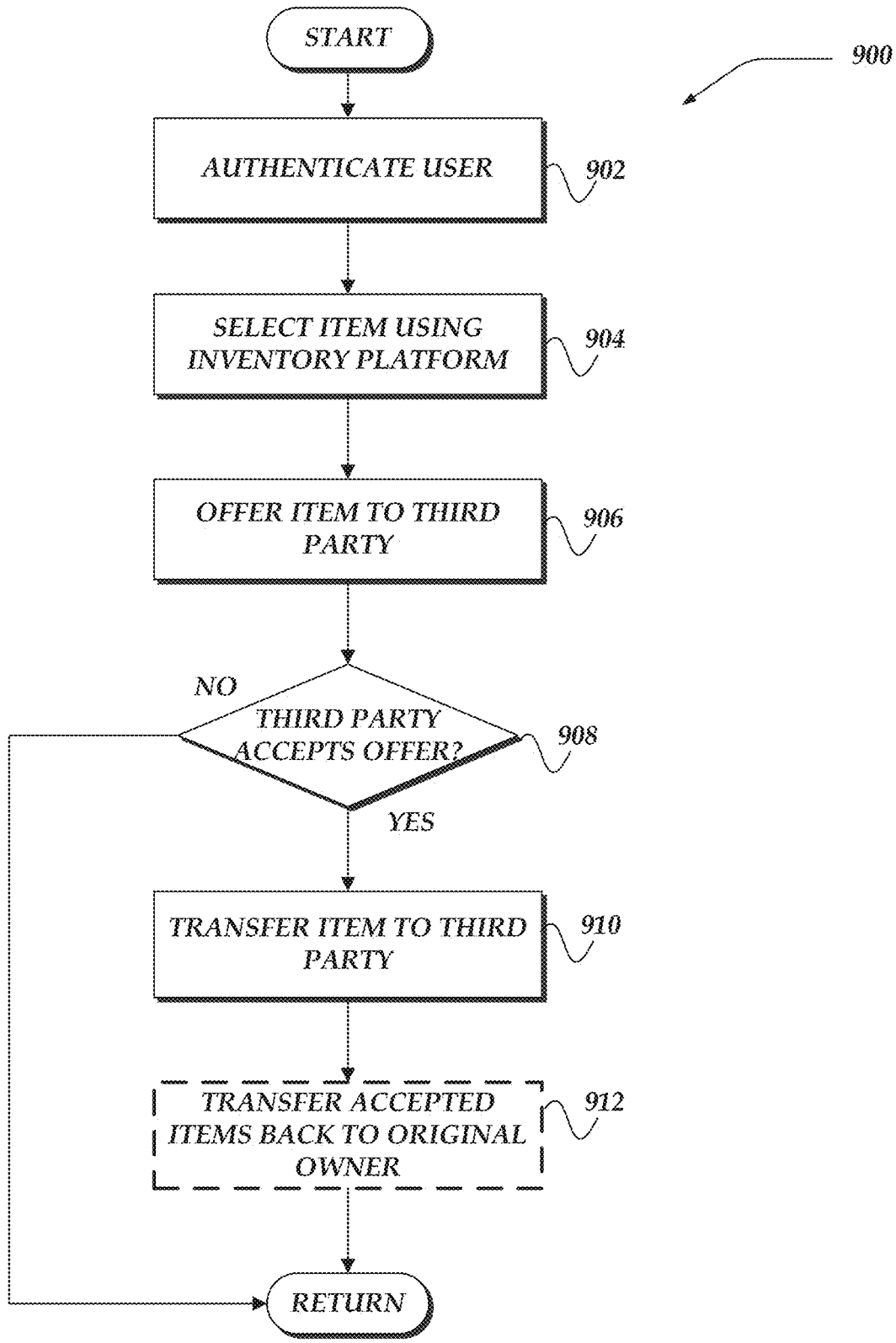
FIG. 9 illustrates an overview flowchart for a process for management and organization of personal inventory in accordance with one or more of the various embodiments.

FIG. 9 illustrates an overview flowchart for process 900 for management and organization of personal inventory in accordance with one or more of the various embodiments. After a start block, at block 902, in one or more of the various embodiments, a user may be authenticated by the inventory platform. In one or more of the various embodiments, the user may be enabled to provide various credentials to authenticate with the inventory platform. In one or more of the various embodiments, the credentials may include, usernames, passwords, biometric information (e.g., fingerprints, voice prints, retinal information, or the like), pin numbers, cryptographic certificates, device information/identities, or the like, or combination thereof.

In one or more of the various embodiments, the inventory platform may authenticate the user based on their credentials. Accordingly, in some embodiments, access to one or more features of the inventory platform may be provided to the user based on their access permissions.

In one or more of the various embodiments, the inventory platform may be arranged to authenticate users by employing one or more external services. In some embodiments, the inventory platform may be configured to employ authentication services offered by one or more social media platforms to authenticate users. For example, in some embodiments, the inventory platform may be arranged to employ an open standard for authorization (OAuth) to authenticate a user by way of one or more of their social media accounts.

At block 904, in one or more of the various embodiments, the authenticated user may select one or more items using the inventory platform. In some embodiments, the one or more items may be selected from the user's inventory catalog provided by the inventory platform and displayed using an inventory client application.

At block 906, in one or more of the various embodiments, the user may employ the inventory platform to offer the one or more items to one or more third-parties. In one or more of the various embodiments, inventory client application may be arranged to enable the user select one or more items and one or more third-parties. In one or more of the various embodiments, the user may have a previous relationship (e.g., social network friends, or the like) the selected third-party. Or, in some embodiments, the third-party may have been identified by other means. For example, as described above, in one or more of the various embodiments, third-parties may include online marketplaces, charities, buyers, renters, borrowers (e.g., people the items may be shared with), or the like.

In one or more of the various embodiments, the item information associated with the selected one or more items may be updated to indicate the type of offer (e.g., rent, share, barter, sell, trade, sell, or the like) associated with the one or more items. Accordingly, in some embodiments, the inventory catalog may be arranged to include an visible indication of the offer(s) that may be associated with various items (if any).

In one or more of the various embodiments, the inventory platform may be arranged to notify the third-party that the items were selected for transfer to them. Notifications may be in the form or emails, text messages, push notification (e.g., via the inventory client application), or the like, or combination thereof.

In one or more of the various embodiments, the user may direct the offered items must be accepted or decline in total or that they may be accepted or declined by piece. For example, the user may offer a table and four chairs and require that the five items be accepted together or not at all. Likewise, in some embodiments, the user may offer 10 books and allow individual books to be accepted or declined by the third-party.

At decision block 908, in one or more of the various embodiments, if a third-party accepts one or more of the offered items, control may flow to block 910; otherwise, control may be returned to a calling process. In one or more of the various embodiments, the third-party may accept or decline the transfer of the items. In one or more of the various embodiments, the third-party may accept or decline a portion of the offered items if piecemeal acceptance has been allowed by the user making the offers.

At block 910, in one or more of the various embodiments, the inventory platform may perform actions to transfer the one or more items to the third-party. In one or more of the various embodiments, the inventory platform may be arranged to schedule the collection and delivery of the items. In one or more of the various embodiments, collection schedule options may be provided to the user and delivery options to the third-party. Accordingly, collection and delivery instructions may be provided to a distribution organization.

In some embodiments, the items may be temporarily stored after they are collected from the user before they are delivered to the third-party. In some embodiments, the collection and delivery may be performed during the same transfer route (e.g., during the same distribution trip) if the schedule options and locations may accommodate it.

In one or more of the various embodiments, if the items are located at a storage station (rather that at the user's residence), the inventory platform may deliver them according the third-party's schedule. Likewise, if the third-party intends to leave the items (for now) at the storage station, the inventory platform may be arranged to perform the transfer without delivery. In this example, the third party may schedule delivery later or leave the transferred items at the storage station indefinitely.

At block 910, in one or more of the various embodiments, the inventory information for the one or more items may be updated. In one or more of the various embodiments, if one or more items are transferred to a third-party, their item information may be updated accordingly.

At block 912, in one or more of the various embodiments, optionally, if the transferred items were transferred as part of a rental, borrowing, or sharing agreement, the inventory platform may be arranged to perform actions to return the transferred items to their owner. Accordingly, in some embodiments, the inventory platform may be arranged to obtain the necessary scheduling instructions and provide the appropriate collection and delivery instructions to the distribution organizations to return the shared, rented, or borrowed items to the owner. In some embodiments, this block may be considered optional if the transferred items are not intended to be returned to their owner. Next, control may be returned to a calling process.

Figure 10:
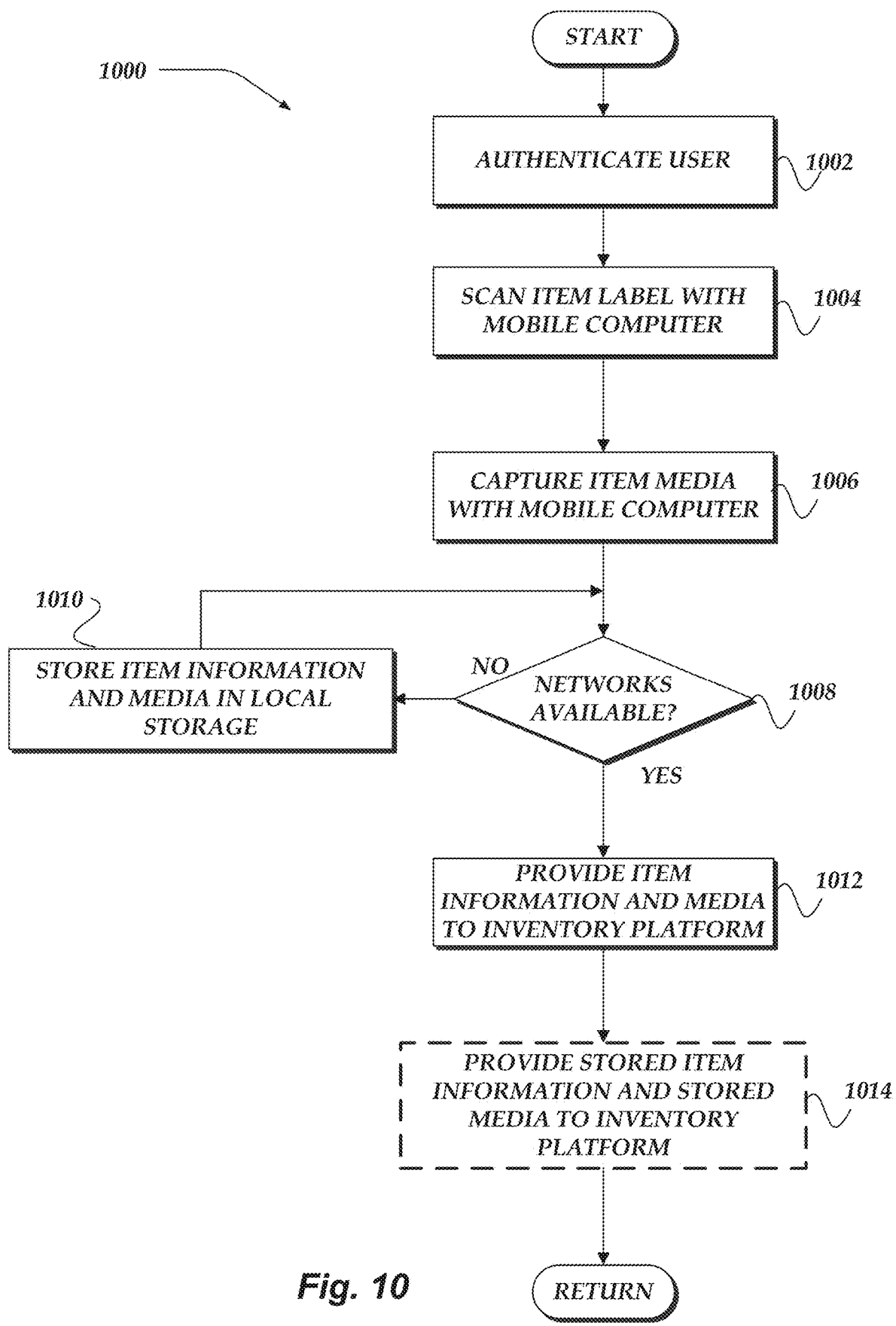
FIG. 10 illustrates an overview flowchart for a process for adding items to a personal inventory catalog in accordance with one or more of the various embodiments.

FIG. 10 illustrates an overview flowchart for process 1000 for adding items to a personal inventory catalog in accordance with one or more of the various embodiments. After a start block, at block 1002, in one or more of the various embodiments, a user may be authenticated by the inventory platform. In one or more of the various embodiments, the user may be enabled to provide various credentials to authenticate with the inventory platform. In one or more of the various embodiments, the credentials may include, usernames, passwords, biometric information (e.g., fingerprints, voice prints, retinal information, or the like), pin numbers, cryptographic certificates, device information/identities, or the like, or combination thereof.

In one or more of the various embodiments, the inventory platform may authenticate the user based on their credentials. Accordingly, in some embodiments, access to one or more features of the inventory platform may be provided to the user based on their access permissions.

In one or more of the various embodiments, the inventory platform may be arranged to authenticate users by employing one or more external services. In some embodiments, the inventory platform may be configured to employ authentication services offered by one or more social media platforms to authenticate users. For example, in some embodiments, the inventory platform may be arranged to employ an open standard for authorization (OAuth) to authenticate a user by way of one or more of their social media accounts.

At block 1004, in one or more of the various embodiments, the authenticated user may scan item labels using a mobile computer. In one or more of the various embodiments, each item managed by the inventory platform may be associated with a label and/or label identifier. In some embodiments, the labels may be affixed by a user to the items. In some embodiments, the items may be provided with labels already on them. Also, in one or more of the various embodiments, labels may be affixed to storage containers that may be used for holding one or more items.

In one or more of the various embodiments, a user may scan item labels using a camera on a mobile computer or smart phone. In some embodiments, label scanning may be a feature of the inventory client application. Alternatively, in some embodiments, label scanning (e.g., bar/QR code scanning) may be a built-in feature of the mobile computer.

In one or more of the various embodiments, labels may be arranged to enable Radio Frequency Identification (RFID) scanning, such as one or more RFID enabled tags that may be read (e.g., scanned) using one or more of Near Field communication (NFC), Bluetooth, Bluetooth LE, or other RFID reading technologies. In some embodiments, such RFID reading technology may be included in the mobile computer used by the user, including smart phone, dedicated RFID reading handheld terminals, or the like.

In one or more of the various embodiments, the user may manually enter label identifier information shown on the label using a keyboard the inventory client application. Further, in some embodiments, voice commands may be used to enter label identifiers.

At block 1006, in one or more of the various embodiments, the user may capture media for one or more items using the mobile computer. In one or more of the various embodiments, the user may be prompted to take one or more photographs or videos of the items associated with the label(s). In one or more of the various embodiments, the photographs may be used for identification and/or mnemonic recall of the items.

In one or more of the various embodiments, the inventory client application may be arranged to capture the media. In other embodiments, the inventory client application may be arranged upload media stored on the mobile computer (e.g., from the photo application).

At decision block 1008, in one or more of the various embodiments, if one or more qualified networks may be available, control may flow to block 1012; otherwise, control may flow to block 1010. In one or more of the various embodiments, the inventory client application may be arranged to examine the network connectivity of the mobile computer. Also, the inventory client application may be arranged honor user preferences with respect to which networks may be used by the application. For example, in some embodiments, the user may be enabled to restrict the inventory client application to use Wi-Fi networks rather than cellular data networks. Accordingly, a network may be considered available if its connection quality is above a defined threshold and the user preferences allow access to the network.

In one or more of the various embodiments, the inventory platform may be arranged to enable different portions of the item information to be uploaded using different networks. For example, the inventory client application may be enabled to allow test based item information to be uploaded using one or more networks even though digital media may restricted. For example, light-weight text-based information may be enable to upload over expensive/slow cellular networks. In contrast, for example, the inventory client application may be configured to force heavy-weight digital media, such as images, audio, or video to use Wi-Fi networks.

At block 1010, in one or more of the various embodiments, the item information and the item media may be stored in a local memory on the mobile computer that may be configured and arranged to store the item information. Next, control may loop back to decision block 1008. In one or more of the various embodiments, since one or more qualified networks are unavailable the item information and the item media may be stored on the mobile computer.

In one or more of the various embodiments, the inventory client application may periodically re-test the available networks to determine if a qualified network if available.

At block 1012, in one or more of the various embodiments, since one or more qualified networks may be available to the mobile computer, the item information and the digital media may be provided to the inventory platform over the one or more qualified networks. In some embodiments, different portions of the item information and/or digital media may have one or more different qualified networks. Accordingly, in some embodiments, the portions of the item information and/or digital media that may be configured to use the one or more qualified network may be uploaded, while the remainder remains stored locally on the mobile computer.

At block 1014, in one or more of the various embodiments, optionally, the locally stored item information and the item media may be provided to the inventory platform over the one or more qualified networks. In some embodiments, different portions of the item information and/or item digital media may have one or more different qualified networks. Accordingly, in some embodiments, the portions of the item information and/or digital media that may be configured to use the one or more qualified network may be uploaded, while the remainder remains stored locally on the mobile computer.

In some embodiments, this block may be considered optional because locally stored information/images may be absent. Next, in some embodiments, control may be returned to a calling process.

Figure 11:
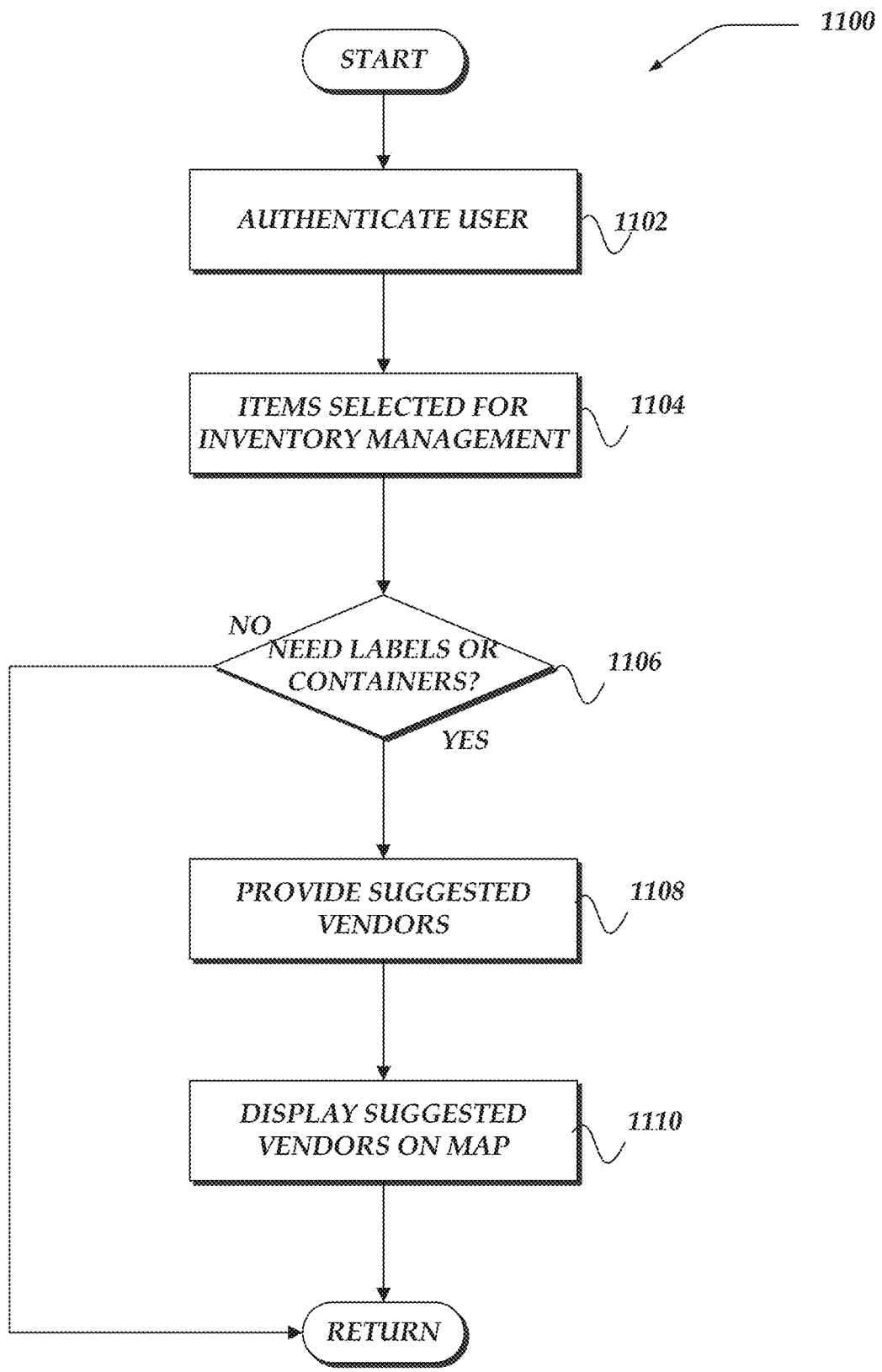
FIG. 11 illustrates an overview flowchart for a process for providing labels in accordance with one or more of the various embodiments.

FIG. 11 illustrates an overview flowchart for process 1100 for providing labels in accordance with one or more of the various embodiments. After a start block, at block 1102, in one or more of the various embodiments, a user may be authenticated by the inventory platform. In one or more of the various embodiments, the user may be enabled to provide various credentials to authenticate with the inventory platform. In one or more of the various embodiments, the credentials may include, usernames, passwords, biometric information (e.g., fingerprints, voice prints, retinal information, or the like), pin numbers, cryptographic certificates, device information/identities, or the like, or combination thereof.

In one or more of the various embodiments, the inventory platform may authenticate the user based on their credentials. Accordingly, in some embodiments, access to one or more features of the inventory platform may be provided to the user based on their access permissions.

In one or more of the various embodiments, the inventory platform may be arranged to authenticate users by employing one or more external services. In some embodiments, the inventory platform may be configured to employ authentication services offered by one or more social media platforms to authenticate users. For example, in some embodiments, the inventory platform may be arranged to employ an open standard for authorization (OAuth) to authenticate a user by way of one or more of their social media accounts.

At block 1104, in one or more of the various embodiments, the authenticated user may select one or more items for inventory management. As described above, in one or more of the various embodiments, the user may select one or more items at their residence or location for adding to their inventory catalog.

At decision block 1106, in one or more of the various embodiments, if the user needs more labels or containers, control may flow to block 1108; otherwise, control may be returned to a calling process. In one or more of the various embodiments, each item added to a user's inventory catalog should be associated with a label and a label identifier. Accordingly, in one or more of the various embodiments, if the user does not have any labels available they may need to acquire more.

At block 1108, in one or more of the various embodiments, the inventory platform may provide one or more suggested vendors where the labels and/or containers may be obtained. In one or more of the various embodiments, the inventory platform may provide an ordered list of vendors from which the user may obtain more labels. In one or more of the various embodiments, these vendors may provide the labels if the user visits them in person.

In one or more of the various embodiments, the order vendors are shown in the list, or if they are included in the list may depend one or more agreements between the inventory platform operator and the vendors. For example, in some embodiments, some vendors may pay a fee to the inventory platform operator to be featured in the list. Also, in one or more of the various embodiments, vendors may be sorted based on user preferences, such as type of vendor, location, or the like.

At block 1110, in one or more of the various embodiments, the suggested vendors may be displayed on graphical map displayed by the inventory client application. Next, control may be returned to a calling process.

In one or more of the various embodiments, other methods of providing labels and/or label identifiers may be provided. For example, in some embodiments, users may download and print labels. In some embodiments, user may order labels from the inventory platform directly. Accordingly, in one or more of the various embodiments, the new labels may be mailed/shipped directly to the user. Alternatively, in some embodiments, labels may be delivered by the distribution organization with the next collection or delivery of items. Also, in one or more of the various embodiments, a user's request for labels may be satisfied by a nearby distribution organization vehicle that may be near the user's location. In some embodiments, the inventory platform may enable to the user to provide scheduling information (e.g., availability time windows) for the delivery of labels.

Figure 12:
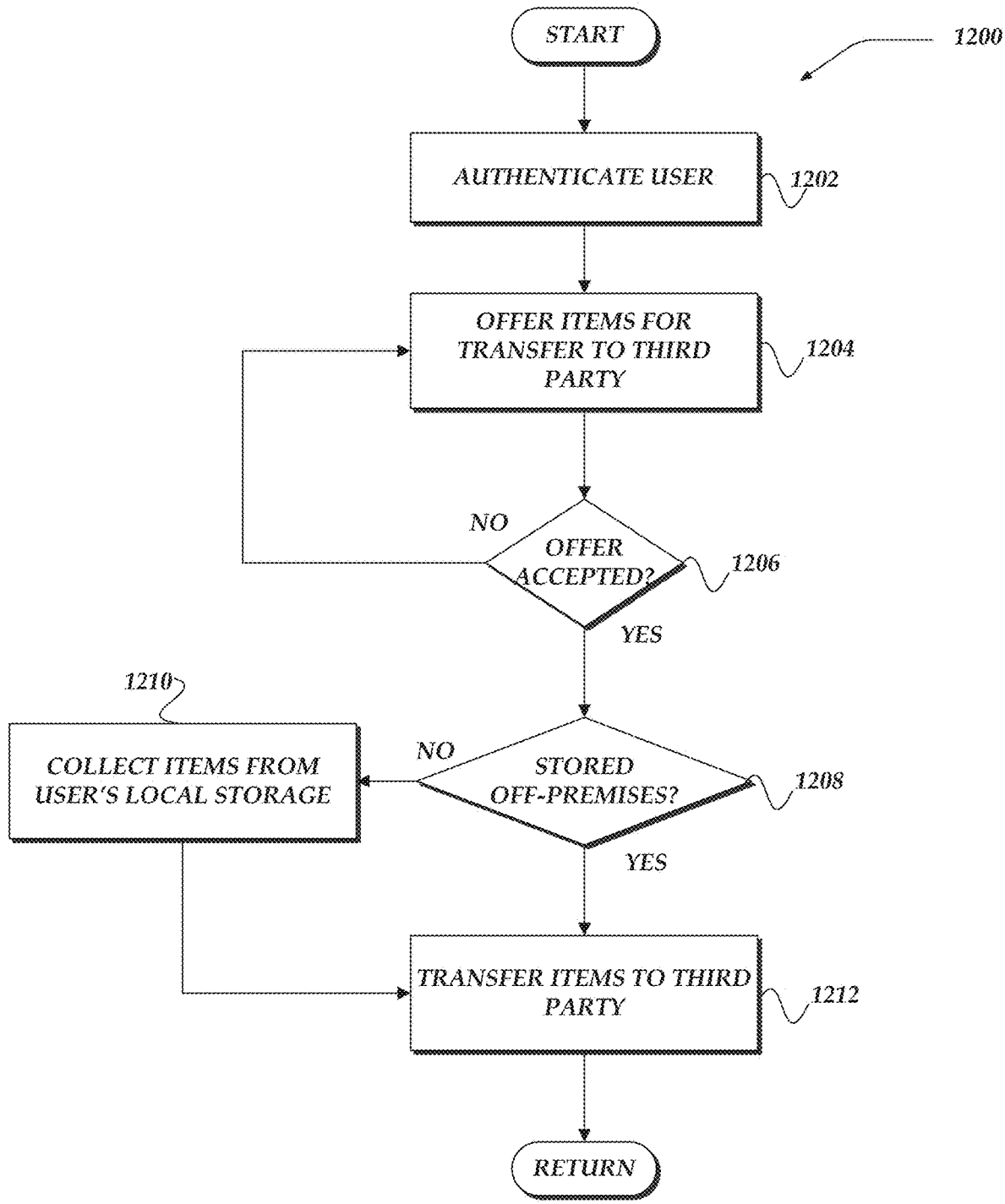
FIG. 12 illustrates an overview flowchart for a process for managing inventory with respect to third-parties in accordance with one or more of the various embodiments.

FIG. 12 illustrates an overview flowchart for process 1200 for managing inventory with respect to third-parties in accordance with one or more of the various embodiments. After a start block, at block 1202, in one or more of the various embodiments, a user may be authenticated by the inventory platform. In one or more of the various embodiments, the user may be enabled to provide various credentials to authenticate with the inventory platform. In one or more of the various embodiments, the credentials may include, usernames, passwords, biometric information (e.g., fingerprints, voice prints, retinal information, or the like), pin numbers, cryptographic certificates, device information/identities, or the like, or combination thereof.

In one or more of the various embodiments, the inventory platform may authenticate the user based on their credentials. Accordingly, in some embodiments, access to one or more features of the inventory platform may be provided to the user based on their access permissions.

In one or more of the various embodiments, the inventory platform may be arranged to authenticate users by employing one or more external services. In some embodiments, the inventory platform may be configured to employ authentication services offered by one or more social media platforms to authenticate users. For example, in some embodiments, the inventory platform may be arranged to employ an open standard for authorization (OAuth) to authenticate a user by way of one or more of their social media accounts.

At block 1204, in one or more of the various embodiments, the authenticated user may employ the inventory platform to offer one or more items to a third-party. As described above, a user may designate one or more items in their inventory catalog as offered to one or more third-parties.

At decision block 1206, in one or more of the various embodiments, if the offer may be accepted by a third-party, control may flow to decision block 1208; otherwise, control may flow to block 1210.

At decision block 1208, in one or more of the various embodiments, if the items being offered are stored at an off-premises storage station, control may flow to block 1212; otherwise, control may flow to block 1210.

At block 1210, in one or more of the various embodiments, the inventory platform may perform actions to collect the one or more items from the user's on-premises storage. In one or more of the various embodiments, this may include providing scheduling options to the user, providing collection instructions to the distribution organization based on the selected scheduling options, or the like.

At block 1212, in one or more of the various embodiments, the inventory platform may perform actions to transfer the one or more items to the third-party. In one or more of the various embodiments, this may include providing delivery scheduling options to the user, providing delivery instructions to the distribution organization based on the selected delivery scheduling options, or the like. Note, in some embodiments, if the items are located at an off-premise storage station, the items do not need to collected from the user.

Also, in one or more of the various embodiments, one or more staff associated with the inventory platform and/or the storage station may confirm that the offered/accepted items are consistent with the agreement entered by the third-party. For example, in one or more of the various embodiments, if the accepted offer is four good condition kitchen chairs, the inventory platform staff may confirm that there are four chair in good condition that appear similar as shown in item media. If there may be discrepancies discovered, the may flag the order and/or take additional remedial actions. Next, in some embodiments, control may be returned to a calling process.

Figure 13:
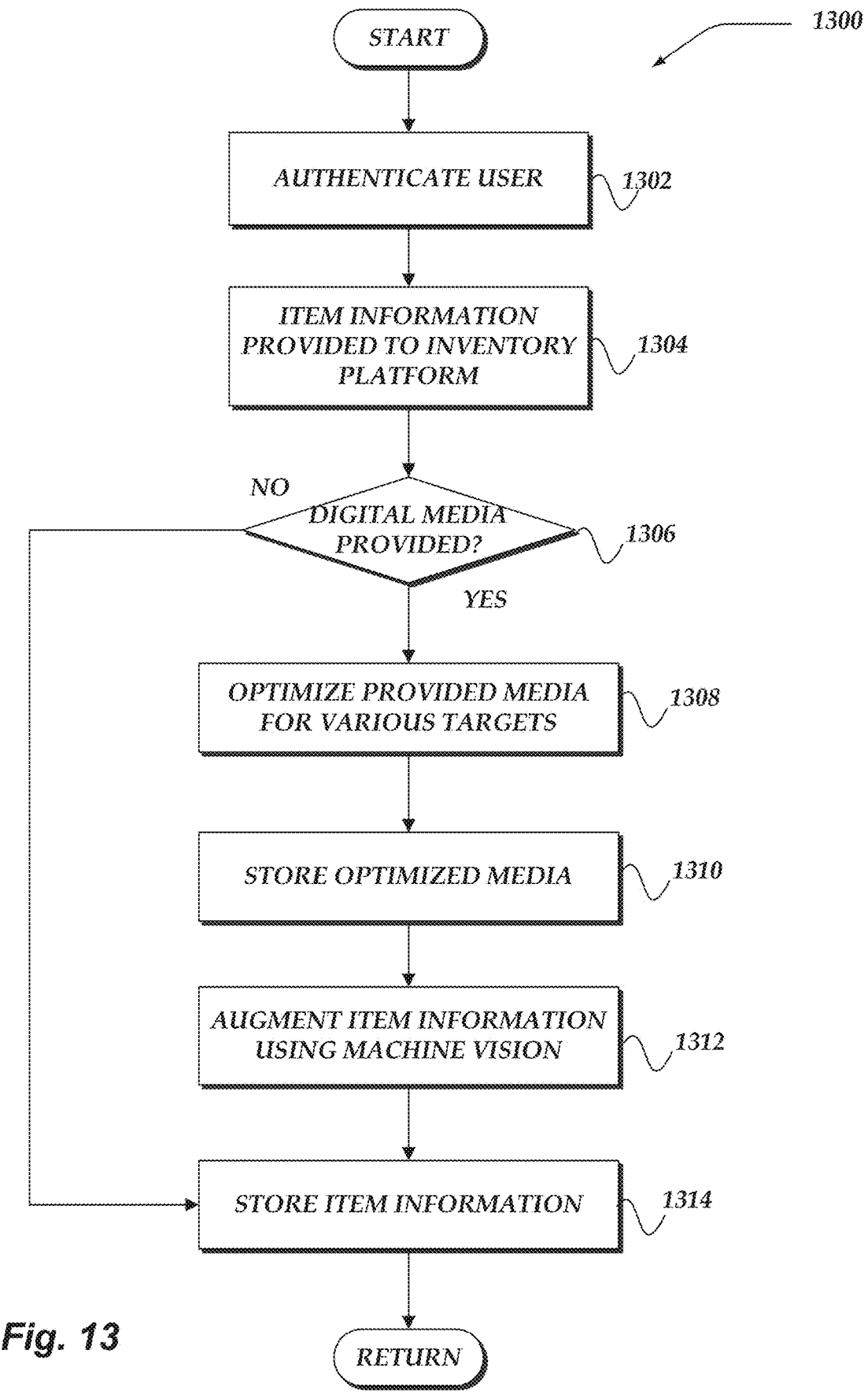
FIG. 13 illustrates a flowchart for a process for optimizing item media to improve operations of the computers and networks in accordance with one or more of the various embodiments.

FIG. 13 illustrates a flowchart for process 1300 for optimizing item media to improve operations of the computers and networks in accordance with one or more of the various embodiments. After a start block, at block 1302, in one or more of the various embodiments, a user may be authenticated by the inventory platform. In one or more of the various embodiments, the user may be enabled to provide various credentials to authenticate with the inventory platform. In one or more of the various embodiments, the credentials may include, usernames, passwords, biometric information (e.g., fingerprints, voice prints, retinal information, or the like), pin numbers, cryptographic certificates, device information/identities, or the like, or combination thereof.

In one or more of the various embodiments, the inventory platform may authenticate the user based on their credentials. Accordingly, in some embodiments, access to one or more features of the inventory platform may be provided to the user based on their access permissions.

In one or more of the various embodiments, the inventory platform may be arranged to authenticate users by employing one or more external services. In some embodiments, the inventory platform may be configured to employ authentication services offered by one or more social media platforms to authenticate users. For example, in some embodiments, the inventory platform may be arranged to employ an open standard for authorization (OAuth) to authenticate a user by way of one or more of their social media accounts.

At block 1304, in one or more of the various embodiments, inventory information for one or more items may be provided to the inventory platform. As described above, one or more embodiments may be arranged to enable a user to provide item information and associate it with a label and/or label identifier.

At decision block 1306, in one or more of the various embodiments, if digital media associated with the item is provided, control may flow block 1308; otherwise, control may flow to block 1312. In one or more of the various embodiments, the inventory platform may be arranged to encourage or require users to capture media associated with their items, such as digital images, videos, supporting documents (e.g., manuals, certificates of authenticity, or the like), audio, or the like, or combination thereof.

At block 1308, in one or more of the various embodiments, the inventory platform may be arranged to optimize the provided digital media for one or more various target devices. In one or more of the various embodiments, users may be expected to review inventory catalogs using a variety of devices/computers communication using networks that may vary in quality and/or capabilities. Accordingly, in one or more of the various embodiments, the inventory platform may launch background processes that process the supplied media to generate versions that may be optimized for different target devices and/or applications.

In one or more of the various embodiments, the inventory platform may be configured to generate different sizes of provided images. For example, in some embodiments, image thumbnails may be automatically provided by processing the original images provided by the user.

In one or more of the various embodiments, video may be re-coded using different codecs that may be more efficient for smart phones, web applications, or the like, or combination thereof.

In one or more of the various embodiments, providing media optimizations the inventory platform may be arranged to accept more types media and/or formats. In some embodiments, media formats that may be rare, obsolete, or the like, may be accepted from users and converted into more common/efficient formats for displaying on more types of client computers operating with various levels of networking quality/capacity.

Also, in one or more of the various embodiments, image file sizes may be reduced by auto-cropping, scaling, re-sampling (e.g., under-sampling), or the like. Accordingly, performance of the networks may be improved. Likewise, performance of the inventory client application and/or client computers may be improved by providing media that is smaller in size and/or performance impact.

In one or more of the various embodiments, optimizations may include media enhancements such as, auto-balancing images, image smoothing/motion stabilization for video, or the like. In one or more of the various embodiments, original versions of the media may be preserved to be provided on demand.

At block 1310, in one or more of the various embodiments, the inventory platform may store the optimized digital media. In one or more of the various embodiments, the optimized media may be stored and associated with the items they represent.

At block 1312, in one or more of the various embodiments, the inventory information provided by the user may be augmented based on machine vision and/or machine learning. Accordingly, in some embodiments, the inventory platform may be arranged to attempt to identify the items based on item media such as, image, video, audio, or the like. In one or more of the various embodiments, a learning engine, such as learning engine 326 may be arranged to produce one or more classifiers, models, or the like, based on item information and/or user feedback of some or all of the user community of the inventory platform.

In some embodiments one or more machine vision methods paired with machine learning based classifiers, models, or the like, may be employed to identify items based on user provided media. Accordingly, in one or more of the various embodiments, if the items may be sufficiently identified, item information may added and/or modified based on the identification of the item. For example, if the make and model of an item may be recognized, the inventory platform may be arranged to provide accurate item information such as, size, volume, name, brand name, related items, pricing (value), or the like, or combination thereof.

In one or more of the various embodiments, if the user has provided conflicting item information, the inventory platform may be arranged to request confirmation from the user before modifying the conflicting item values.

In one or more of the various embodiments, the inventory platform may provide a confidence score that may represent the expectation that the determined/recommended item information may be correct. In some embodiments, the confidence scores may be displayed to the users when offering suggesting item information values.

Also, in one or more of the various embodiments, if the user accepts or rejects item information suggestions, the inventory platform may be arranged to provide that feedback information to the learning engine to update/improve the classifiers, models, or the like, used for suggesting the item information values.

At block 1314, in one or more of the various embodiments, the inventory platform may store the item information and associate it with the appropriate optimized media. Next, in some embodiments, control may be returned a calling process.

Figure 14:
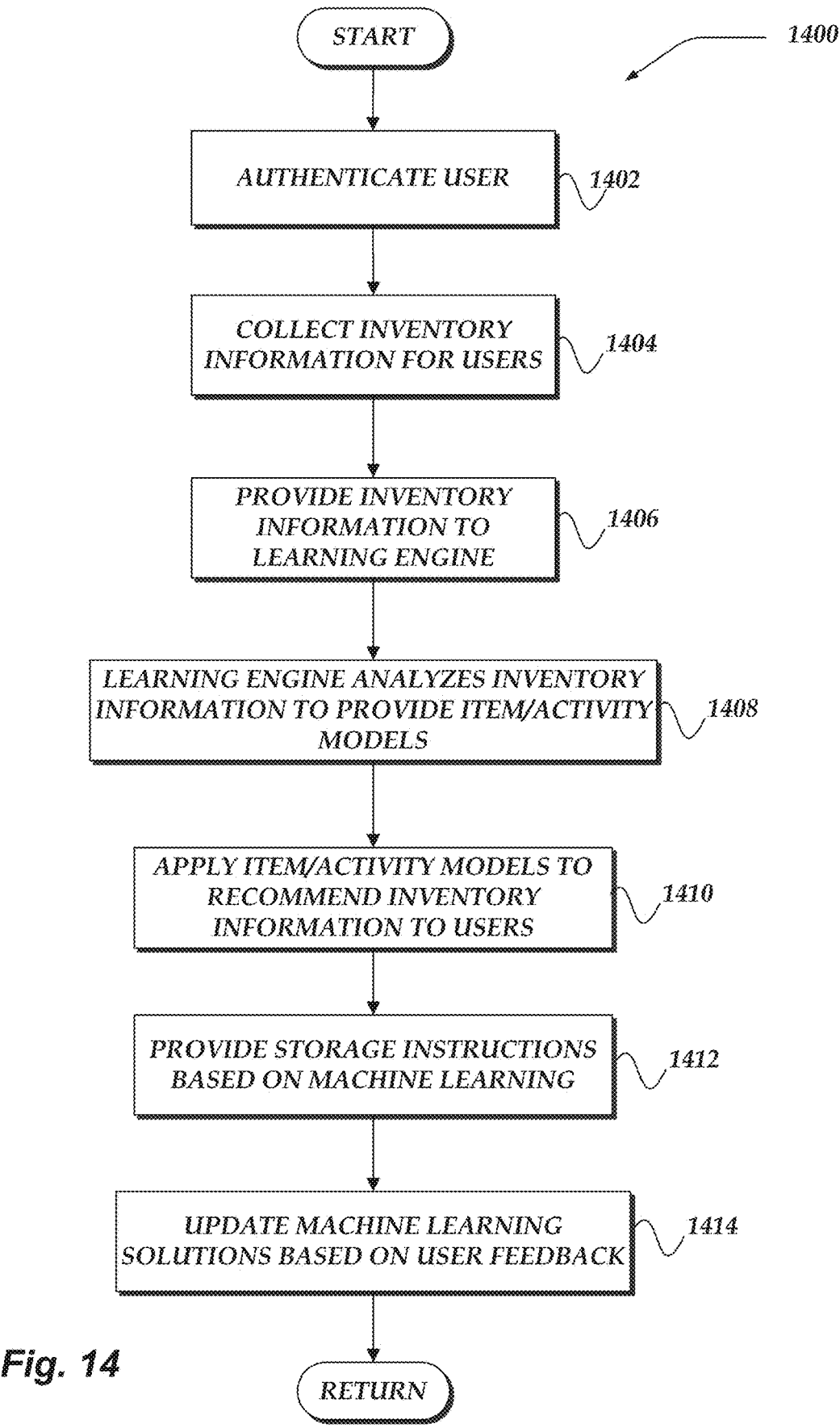
FIG. 14 illustrates a flowchart for a process for providing item classifiers in accordance with one or more of the various embodiments.

FIG. 14 illustrates a flowchart for process 1400 for providing item classifiers in accordance with one or more of the various embodiments. After a start block, at block 1402, in one or more of the various embodiments, a user may be authenticated by the inventory platform. In one or more of the various embodiments, the user may be enabled to provide various credentials to authenticate with the inventory platform. In one or more of the various embodiments, the credentials may include, usernames, passwords, biometric information (e.g., fingerprints, voice prints, retinal information, or the like), pin numbers, cryptographic certificates, device information/identities, or the like, or combination thereof.

In one or more of the various embodiments, the inventory platform may authenticate the user based on their credentials. Accordingly, in some embodiments, access to one or more features of the inventory platform may be provided to the user based on their access permissions.

In one or more of the various embodiments, the inventory platform may be arranged to authenticate users by employing one or more external services. In some embodiments, the inventory platform may be configured to employ authentication services offered by one or more social media platforms to authenticate users. For example, in some embodiments, the inventory platform may be arranged to employ an open standard for authorization (OAuth) to authenticate a user by way of one or more of their social media accounts.

At block 1404, in one or more of the various embodiments, the inventory platform may be arranged to collect item information and inventory activity information associated with the community of users.

In one or more of the various embodiments, inventory activity information may be records of user activity. This may include records of collections, deliveries, offers, label use, adding/removing items, recalling items from off-premises storage stations, sending items to off-premises storage, or the like.

In one or more of the various embodiments, the information may be anonymized, aggregated, normalized, formatted, segmented, or the like, to facilitate data mining and machine learning and protect user privacy. In some embodiments, users may be enabled to opt-out or opt-in to data mining and/or machine learning activities.

In one or more of the various embodiments, basic item information may be collected and/or data mined as well. For example, information related to item size, storage locations, item type, or the like, may be analyzed as well. Also, in one or more of the various embodiments, item media captured by users may be collected further machine learning analysis as well.

In some embodiments, the data may be selected and/or transformed differently depending on the type of data mining or machine learning that may be employed.

At block 1406, in one or more of the various embodiments, an inventory engine may provide the inventory information to a learning engine. In one or more of the various embodiments, the inventory platform may include one or more learning engines, such as learning engine 326 that may perform different machine learning processes to provide one or more classifiers, models, or the like, based on data mining the item information associated with users.

In one or more of the various embodiments, the inventory platform may be arranged to enable users to exclude one or more portions of their items/item information from the learning engine.

At block 1408, in one or more of the various embodiments, the learning engine may be arranged to analyze the item inventory information to provide one or more classifiers, one or more models, or the like. In one or more of the various embodiments, learning engines may be arranged to provide one or more machine learning solutions using various types of machine learning, such as deep learning neural networks, linear regression, or the like. In some embodiments, inventory activity models may be used by the inventory platform to predict usage and load spikes for allocating/stock-piling off-premises storage space and/or distribution organization capacity and availability. In one or more of the various embodiments, the learning engine may identify user trends that may be communicated to other users.

At block 1410, in one or more of the various embodiments, the inventory platform may be arranged to employ one or more machine learning solutions to provide recommendations to the users. For example, in one or more of the various embodiments, the inventory platform may remind users that they may want to retrieve holiday decorations from off-premise storage as holidays approach.

At block 1412, in one or more of the various embodiments, the inventory platform may be arranged to employ one or more machine learning solutions to provide improved storage instructions. In one or more of the various embodiments, machine learning solutions may predict activity trends that may incorporated into improving the efficiency of off-premise storage of item. In some embodiments, if a machine learning solution indicates the certain types of items are commonly retrieved at certain times, management of the storage stations may be improved. At block 1414, in one or more of the various embodiments, the inventory platform may be arranged to update one or more machine learning solutions based on user feedback. In some embodiments, a learning engine, such as learning engine 326 may be provided user feedback information that may be used to improve one or more machine learning solutions. For example, if users ignore recommended activities, this may provide negative feedback that may be used to train improved machine learning solutions. Likewise, for example, users may be enabled to provide feedback with respect machine vision solutions (e.g., item recognition). Accordingly, in this example, the learning engine may continuously improve its machine vision solutions. Next, control may be returned a calling process.

Figure 15:
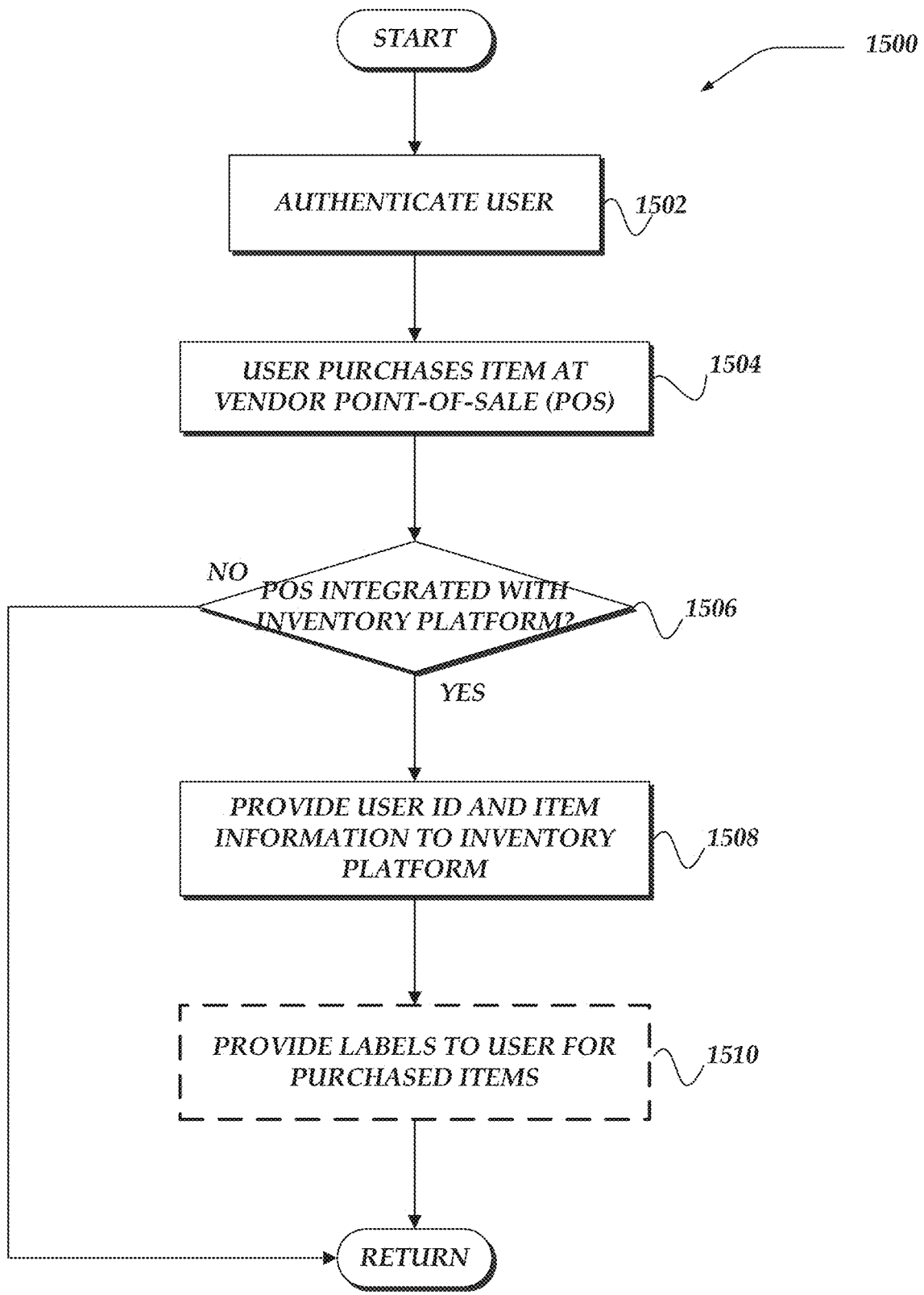
FIG. 15 illustrates a flowchart for a process for providing integrating with vendors in accordance with one or more of the various embodiments.

FIG. 15 illustrates a flowchart for process 1500 for providing integrating with vendors in accordance with one or more of the various embodiments. After a start block, at block 1502, in one or more of the various embodiments, a user may be authenticated by the inventory platform. In one or more of the various embodiments, the user may be enabled to provide various credentials to authenticate with the inventory platform. In one or more of the various embodiments, the credentials may include, usernames, passwords, biometric information (e.g., fingerprints, voice prints, retinal information, or the like), pin numbers, cryptographic certificates, device information/identities, or the like, or combination thereof.

In one or more of the various embodiments, the inventory platform may authenticate the user based on their credentials. Accordingly, in some embodiments, access to one or more features of the inventory platform may be provided to the user based on their access permissions.

In one or more of the various embodiments, the inventory platform may be arranged to authenticate users by employing one or more external services. In some embodiments, the inventory platform may be configured to employ authentication services offered by one or more social media platforms to authenticate users. For example, in some embodiments, the inventory platform may be arranged to employ an open standard for authorization (OAuth) to authenticate a user by way of one or more of their social media accounts.

At block 1504, in one or more of the various embodiments, the authenticated user may purchase one or more items at a vendor point-of-sale (POS).

At decision block 1506, in one or more of the various embodiments, if the POS may be integrated with the inventory platform, control may flow to block 1508; otherwise, control may be returned to a calling process. In one or more of the various embodiments, POS systems of select vendors may be integrated with an inventory platform. Accordingly, they may be arranged to access one or more provided API's that enable product information to be shared with the inventory platform over a network.

At block 1508, in one or more of the various embodiments, user identification information and item information may be provided to the inventory platform. In one or more of the various embodiments, the inventory platform API may be arranged to enable user identification information and select item information to be provided to the inventory platform. Accordingly, the inventory platform may authenticate the user and prepare to add the items to the user's inventory catalog.

In one or more of the various embodiments, the items may be provisionally added until the user confirms the item and provides location information for the item.

At block 1510, in one or more of the various embodiments, optionally, one or more labels for the purchased items may be provided to the user. In one or more of the various embodiments, the inventory platform may enable the POS system to print labels for the purchases items. In other embodiments, the inventory platform may provision a range of labels that have been previously provided to the vendor for use with the purchases items.

In some embodiments, the inventory platform may communicate how many labels the vendor should provide to the user. Because in some embodiments, some purchased items may be ineligible for inventory management. For example, in some embodiments, perishable items may be deemed ineligible for inventory management.

In one or more of the various embodiments, the inventory platform may be configured to have a list of eligible and/or a list of ineligible items. Accordingly, labels may be provisioned for eligible items.

In some embodiments, this block may be optional because in some embodiments, items may already have labels affixed. Also, in some cases, the user may already have sufficient blank/unassigned labels in his or her inventory catalog or otherwise in their possession. Next, in some embodiments, control may be returned to a calling process.

Figure 16:
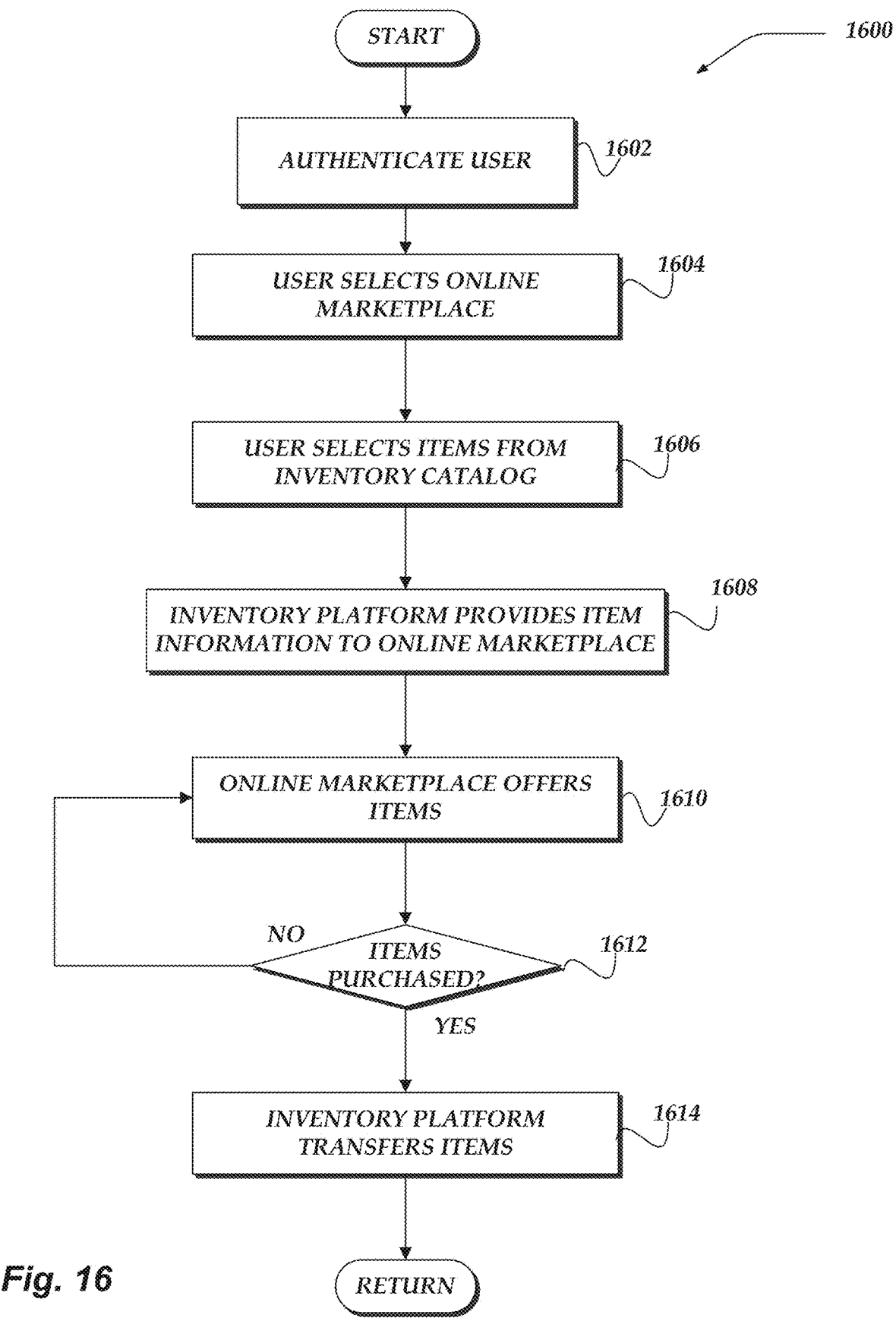
FIG. 16 illustrates a flowchart for a process for integrating inventory platforms with online vendors in accordance with one or more of the various embodiments.

FIG. 16 illustrates a flowchart for process 1600 for integrating inventory platforms with online vendors in accordance with one or more of the various embodiments. After a start block, at block 1602, in one or more of the various embodiments, a user may be authenticated by the inventory platform. In one or more of the various embodiments, the user may be enabled to provide various credentials to authenticate with the inventory platform. In one or more of the various embodiments, the credentials may include, usernames, passwords, biometric information (e.g., fingerprints, voice prints, retinal information, or the like), pin numbers, cryptographic certificates, device information/identities, or the like, or combination thereof.

In one or more of the various embodiments, the inventory platform may authenticate the user based on their credentials. Accordingly, in some embodiments, access to one or more features of the inventory platform may be provided to the user based on their access permissions.

In one or more of the various embodiments, the inventory platform may be arranged to authenticate users by employing one or more external services. In some embodiments, the inventory platform may be configured to employ authentication services offered by one or more social media platforms to authenticate users. For example, in some embodiments, the inventory platform may be arranged to employ an open standard for authorization (OAuth) to authenticate a user by way of one or more of their social media accounts.

At block 1604, in one or more of the various embodiments, the authenticated user may select one or more online marketplaces. In one or more of the various embodiments, the inventory platform may provide a list of one or more online marketplaces that may be available for the user to offer items. In one or more of the various embodiments, one or more online marketplaces may be emphasized or otherwise promoted based on agreements made with the inventory platform operator and/or based on user preferences.

In one or more of the various embodiments, the online marketplace may be part of the inventory platform rather than being a third party. For example, in some embodiments, the inventory platform may be arranged to provide one or more ecommerce/online storefronts for renting, trading, donating, bartering, or selling items for users.

At block 1606, in one or more of the various embodiments, the user may select one or more items from their inventory catalog. In one or more of the various embodiments, online marketplaces may be enabled to define various preferences regarding the items they accept. Accordingly, in some embodiments, some items in the user's inventory catalog may be marked as unavailable based on the selected online marketplaces.

At block 1608, in one or more of the various embodiments, the inventory platform may be arranged to provide item information for the selected items to the online marketplace. In one or more of the various embodiments, the inventory platform may be arranged to employ one or more APIs provided by the selected online marketplace to provide item information sufficient for offering the items to their customers.

At block 1610, in one or more of the various embodiments, the online marketplace may offer the items to their customers. In one or more of the various embodiments, the online marketplace may conduct normal operations to display and/or promoted the offered items. In some embodiments, the user (who owns the offered items) may be required to pay a fee in advance, or otherwise enter an agreement to compensate the online marketplace for providing the offer to its customers.

At decision block 1612, in one or more of the various embodiments, if the items are claimed by the online marketplaces customers, control may flow to block 1614; otherwise, control may loop back block 1610. In one or more of the various embodiments, the online marketplace may communicate the purchase information to the inventory platform. In one or more of the various embodiments, the online marketplace may also provide sufficient buyer information to facilitate transfer of the items. In some embodiments, the buyer may be automatically enrolled as an inventory platform user. In other embodiments, the buyer may be automatically enrolled as a temporary/provisional member to facilitate the transfer of the items.

In one or more of the various embodiments, the inventory platform may be arranged to treat the online marketplace as a user to facilitate transfer of the items. For example, in some embodiments, if the online marketplace does not want to share customer information, the items may be transferred to the online marketplace which in turn may deliver them to their customer.

At block 1614, in one or more of the various embodiments, the inventory platform may be arranged to perform actions to transfer the items from the user/owner to the purchaser. In one or more of the various embodiments, these actions may be similar to transferring items to third-parties as described above. Next, control may be returned to a calling process.

Figure 17:
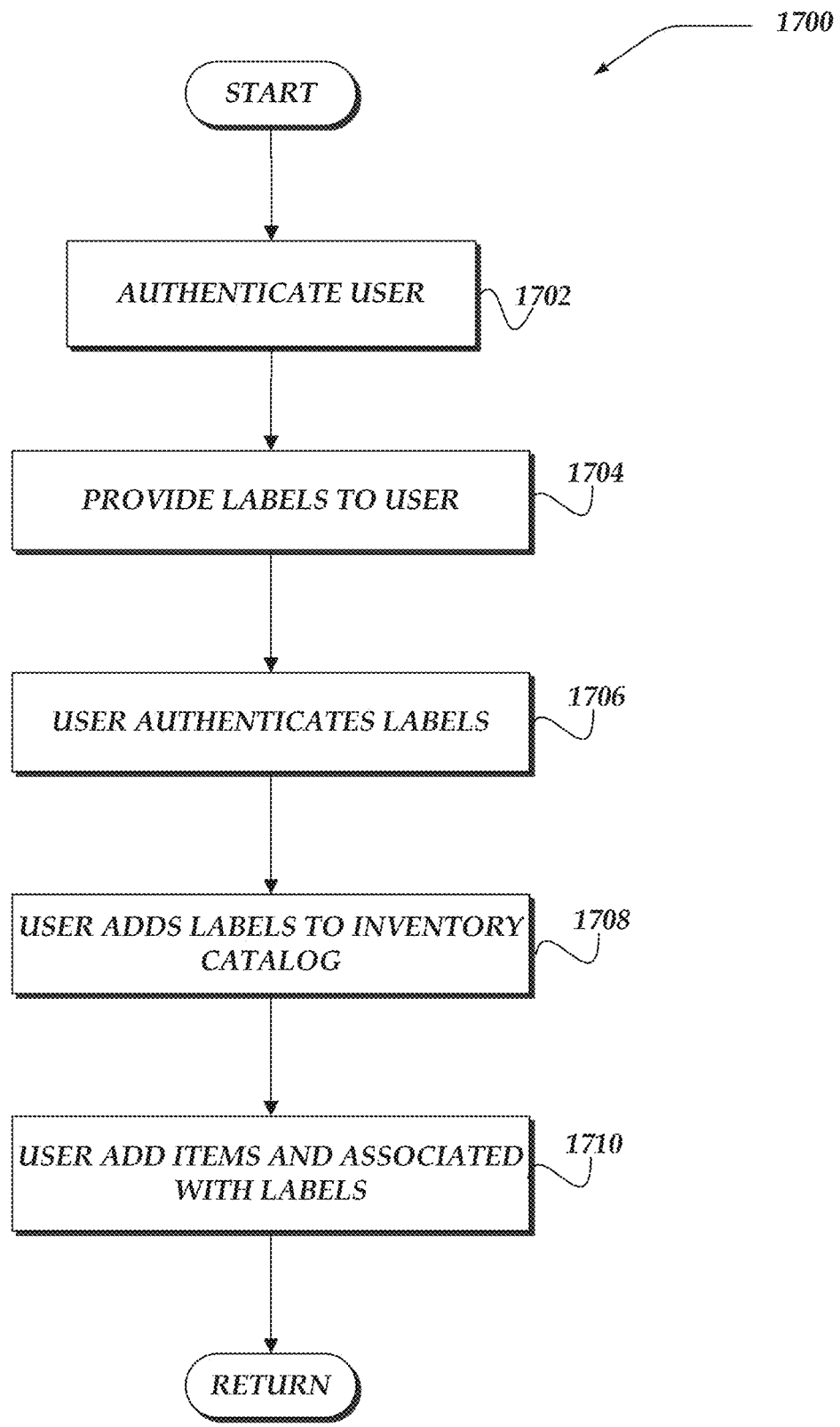
FIG. 17 illustrates a flowchart for a process for provisioning labels in accordance with one or more of the various embodiments.

FIG. 17 illustrates a flowchart for process 1700 for provisioning labels in accordance with one or more of the various embodiments. After a start block, at block 1702, in one or more of the various embodiments, a user may be authenticated by the inventory platform. In one or more of the various embodiments, the user may be enabled to provide various credentials to authenticate with the inventory platform. In one or more of the various embodiments, the credentials may include, usernames, passwords, biometric information (e.g., fingerprints, voice prints, retinal information, or the like), pin numbers, cryptographic certificates, device information/identities, or the like, or combination thereof.

In one or more of the various embodiments, the inventory platform may authenticate the user based on their credentials. Accordingly, in some embodiments, access to one or more features of the inventory platform may be provided to the user based on their access permissions.

In one or more of the various embodiments, the inventory platform may be arranged to authenticate users by employing one or more external services. In some embodiments, the inventory platform may be configured to employ authentication services offered by one or more social media platforms to authenticate users. For example, in some embodiments, the inventory platform may be arranged to employ an open standard for authorization (OAuth) to authenticate a user by way of one or more of their social media accounts.

At block 1704, in one or more of the various embodiments, one or more labels may be provided to the authenticated user. In one or more of the various embodiments, users may be provided labels that include label identifiers as described above.

At block 1706, in one or more of the various embodiments, the user may authenticate the one or more labels. In one or more of the various embodiments, the inventory platform may provide credentials and/or authentication keys that may be associated with sets of labels. For example, each sheet of labels may be provided with an authentication key that may be used to confirm that the labels are bona fide inventory platform labels. In some embodiments, the credentials may be previously associated with the user to ensure that the correct user has the labels. For example, in some embodiments, at the point of purchase, the labels (e.g., one or more sheets of labels) may be exclusively associated with the user. Accordingly, the user may verify that the labels are provisioned with the inventory platform.

At block 1708, in one or more of the various embodiments, the user may associate the one or more labels with their inventory catalog. In one or more of the various embodiments, the user may add labels to their inventory catalog using various methods. In one or more of the various embodiments, a preferred method may be scanning the label using a mobile computer or other code reader. In one or more of the various embodiments, the user may enter the label serial numbers and/or identifiers manually using an inventory client application.

In one or more of the various embodiments, one or more validations/error checking algorithms may be performed to by the inventory client application or the inventory platform to detect data entry mistakes or code scans of non-label codes. For example, in some embodiments, methods that use the Luhn algorithm or variations thereof may be employed to validate label correctness.

At block 1710, in one or more of the various embodiments, the user may add items and associate them with the one or more labels. See, above for detailed descriptions regarding adding items to inventory catalogs. Next, in some embodiments, control may be returned to a calling process.

Figure 18:
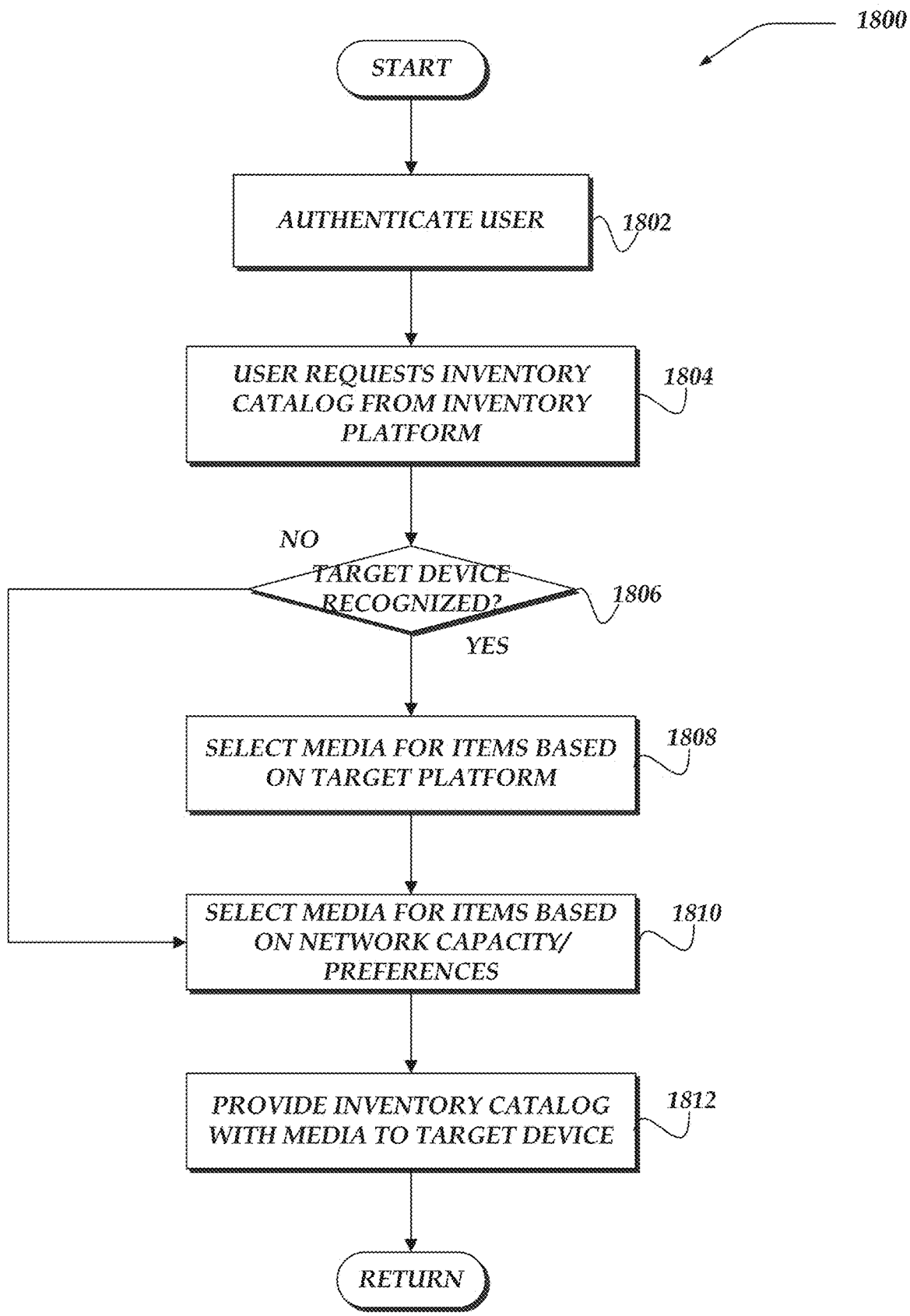
FIG. 18 illustrates a flowchart for a process for selecting inventory catalog media in accordance with one or more of the various embodiments.

FIG. 18 illustrates a flowchart for process 1800 for selecting inventory catalog media in accordance with one or more of the various embodiments. After a start block, at block 1802, in one or more of the various embodiments, a user may be authenticated by the inventory platform. In one or more of the various embodiments, the user may be enabled to provide various credentials to authenticate with the inventory platform. In one or more of the various embodiments, the credentials may include, usernames, passwords, biometric information (e.g., fingerprints, voice prints, retinal information, or the like), pin numbers, cryptographic certificates, device information/identities, or the like, or combination thereof.

In one or more of the various embodiments, the inventory platform may authenticate the user based on their credentials. Accordingly, in some embodiments, access to one or more features of the inventory platform may be provided to the user based on their access permissions.

In one or more of the various embodiments, the inventory platform may be arranged to authenticate users by employing one or more external services. In some embodiments, the inventory platform may be configured to employ authentication services offered by one or more social media platforms to authenticate users. For example, in some embodiments, the inventory platform may be arranged to employ an open standard for authorization (OAuth) to authenticate a user by way of one or more of their social media accounts.

At block 1804, in one or more of the various embodiments, the authenticated user may provide a request to view their inventory catalog to the inventory platform. In one or more of the various embodiments, the request to view the catalog may be provided to the inventory platform using an inventory client application.

At decision block 1806, in one or more of the various embodiments, if the target device may be recognized, control may flow to block 1808; otherwise, control may flow to block 1810. In one or more of the various embodiments, the inventory platform may be arranged to analyze one or more characteristics of the request for information that may be used to determine the type of target device. For example, if the request includes HTTP user-agent information, the inventory platform may be able to determine the type of device making the request from the user-agent information. Also, in some embodiments, the user may be enabled to provide mobile device capability information to the inventory platform. Accordingly, this information may be stored as part of a user profile.

At block 1808, in one or more of the various embodiments, media for the inventory items may be selected based on the target device. In one or more of the various embodiments, since different target devices may have different capabilities, media optimized for the target device may be selected over less optimized media. For example, if the target device is known to have a limited display space, smaller digital images may be selected rather than larger digital images.

In one or more of the various embodiments, users may define one or more media preferences, such as image resolution preferences, preferred/allowed media types (e.g., selecting among images, audio, videos, virtual reality content, or the like), or the like.

In one or more of the various embodiments, media preferences may be associated with item types and/or item characteristics. For example, in some embodiments, users may selectively define personal preferences such that the inventory platform should select high resolution media for certain items or types of items and low resolution for other items.

At block 1810, in one or more of the various embodiments, media may be selected for items based on network capacity and/or network preferences. In some embodiments, media may be further selected based on the quality of the network connection to the user's client computer and the inventory platform. For example, in some embodiments, if a user is using client computer capable of displaying high resolution media but the current network quality is below a defined quality or capacity threshold, the inventory platform may be arranged to further select media that may be appropriate for the current network quality. Likewise, for example, the inventory platform may be arranged to enable a user to configure the inventory platform to provide high resolution media over Wi-Fi networks and low resolution media over cellular networks, and so on.

At block 1812, in one or more of the various embodiments, the inventory platform may provide the inventory catalog and the selected media to the target device. In one or more of the various embodiments, the inventory client application running on the target device may display the inventory catalog in accordance with the capabilities of the target device. Next, in some embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for managing an inventory of items over a network using a network computer that includes one or more processors that perform actions, comprising:
   instantiating an inventory platform to perform actions, including:
   employing item information associated with each of one or more items that is provided by an owner of the one or more items to a memory to store the item information;
   in response to a selection of a version of the item information, employing a preference to restrict communication for each selected version of the item information having a text based media format to one or more available cellular networks and employing another preference to restrict communication for each selected version of the item information having one or more of an image or audio based media format to one or more available wifi networks; and in response to a request by the owner to transfer the one or more items at a current location of the one or more items to an off-premises storage location, perform further actions, including:
provide collection instructions to a distribution organization, wherein the collection instructions are based on a scheduling option selected by the owner and the current location of the one or more items;
in response to a notification that the one or more items are delivered to the off-premises storage location, generating a new current location and updating the location in the corresponding item information for the one or more items to indicate that they are stored at the off-premises storage location which is geographically different than an old current location, and wherein a machine vision system and machine learning based classifiers and models are employed to identify the one or more items and provide additional item information, including one or more of a size, a volume, a name, a brand name, a value, or a related item; and
employing geolocation information provided by a global positioning systems (GPS) device on a client computer to modify a visual presentation of a client application and one or more of a database, a user interface, an internal process, or a report based on a location of the client computer employed by the user, wherein the modifications include one or more of time zones, languages, or calendar formatting;
providing additional item information to the inventory platform that indicates the owner is offering one or more of sharing the one or more items, renting the one or more items, donating the one or more items, bartering the one or more items, or buying the one or more items; and
providing a list of vendors where the owner may obtain labels or labeled containers, wherein the list of vendors is based on one or more of a current location of the owner or promotional agreements with the vendor.

2. The method of claim 1, wherein the item information includes at least a location, owner information, item dimensions, and a unique label identifier, and wherein the location and the unique label identifier are mapped to each other.

3. The method of claim 1, wherein the one or more cellular or wifi networks are periodically tested for qualifications to determine which networks are available to communicate item information having one or more types of media formats that include one or more of text, images, or audio, and wherein a user includes one or more of the owner or a new owner of the one or more items.

4. The method of claim 1, further comprising:
providing one or more scheduling options to collect the one or more items from the current location and transfer them to the off-premises storage location for the owner of the one or more items.

5. The method of claim 1, wherein the collection instructions include that portion of the item information that includes, the location, the item dimensions and the unique label identifier.

6. The method of claim 1, further comprising:
providing at least a portion of the item information associated with the one or more items to an online marketplace; and wherein the online marketplace provides instructions to the distribution organization to transfer purchased items to the new owner.

7. A system for managing an inventory of items over a network, comprising:
a network computer, comprising:
a memory that stores at least instructions; and
one or more processor devices that execute instructions that perform actions, including:
instantiating an inventory platform to perform actions, including:
employing item information associated with each of one or more items that is provided by an owner of the one or more items to a memory to store the item information;
in response to a selection of a version of the item information, employing a preference to restrict communication for each selected version of the item information having a text based media format to one or more available cellular networks and employing another preference to restrict communication for each selected version of the item information having one or more of an image or audio based media format to one or more available wifi networks; and
in response to a request by the owner to transfer the one or more items at a current location of the one or more items to an off-premises storage location, perform further actions, including:
providing collection instructions to a distribution organization, wherein the collection instructions are based on a scheduling option selected by the owner and the current location of the one or more items;
in response to a notification that the one or more items are delivered to the off-premises storage location, generating a new current location and updating the location in the corresponding item information for the one or more items to indicate that they are stored at the off-premises storage location which is geographically different than an old current location, and wherein a machine vision system and machine learning based classifiers and models are employed to identify the one or more items and provide additional item information, including one or more of a size, a volume, a name, a brand name, a value, or a related item; and
employing geolocation information provided by a global positioning systems (GPS) device on a client computer to modify a visual presentation of a client application and one or more of a database, a user interface, an internal process, or a report based on a location of the client computer employed by the user, wherein the modifications include one or more of time zones, languages, or calendar formatting;
providing additional item information to the inventory platform that indicates the owner is offering one or more of sharing the one or more items, renting the one or more items, donating the one or more items, bartering the one or more items, or buying the one or more items; and
providing a list of vendors where the owner may obtain labels or labeled containers, wherein the list of vendors is based on one or more of a current location of the owner or promotional agreements with the vendor; and
a client computer, comprising:
a memory that stores at least instructions; and
one or more processor devices that execute instructions that perform actions, including:
visually displaying the item information with the client application in the one or more user interfaces and reports on a hardware display.

8. The system of claim 7, wherein the item information includes at least a location, owner information, item dimensions, and a unique label identifier, and wherein the location and the unique label identifier are mapped to each other.

9. The system of claim 7, wherein the one or more cellular or wifi networks are periodically tested for qualifications to determine which networks are available to communicate item information having one or more types of media formats that include one or more of text, images, or audio, and wherein a user includes one or more of the owner or a new owner of the one or more items.

10. The system of claim 7, further comprising:
providing one or more scheduling options to collect the one or more items from the current location and transfer them to the off-premises storage location for the owner of the one or more items.

11. The system of claim 7, wherein the collection instructions include that portion of the item information that includes, the location, the item dimensions and the unique label identifier.

12. The system of claim 7, further comprising:
providing at least a portion of the item information associated with the one or more items to an online marketplace; and
wherein the online marketplace provides instructions to the distribution organization to transfer purchased items to the new owner.

13. A processor readable non-transitory storage media that includes instructions for managing an inventory of items, wherein execution of the instructions by one or more hardware processors performs actions, comprising:
instantiating an inventory platform to perform actions, including:
employing item information associated with each of one or more items that is provided by an owner of the one or more items to a memory to store the item information;
in response to a selection of a version of the item information, employing a preference to restrict communication for each selected version of the item information having a text based media format to one or more available cellular networks and employing another preference to restrict communication for each selected version of the item information having one or more of an image or audio based media format to one or more available wifi networks; and
in response to a request by the owner to transfer the one or more items at a current location of the one or more items to an off-premises storage location, perform further actions, including:
providing collection instructions to a distribution organization, wherein the collection instructions are based on a scheduling option selected by the owner and the current location of the one or more items;
in response to a notification that the one or more items are delivered to the off-premises storage location, generating a new current location and updating the location in the corresponding item information for the one or more items to indicate that they are stored at the off-premises storage location which is geographically different than an old current location, and wherein a machine vision system and machine learning based classifiers and models are employed to identify the one or more items and provide additional item information, including one or more of a size, a volume, a name, a brand name, a value, or a related item; and
employing geolocation information provided by a global positioning systems (GPS) device on a client computer to modify a visual presentation of a client application and one or more of a database, a user interface, an internal process, or a report based on a location of the client computer employed by the user, wherein the modifications include one or more of time zones, languages, or calendar formatting;
providing additional item information to the inventory platform that indicates the owner is offering one or more of sharing the one or more items, renting the one or more items, donating the one or more items, bartering the one or more items, or buying the one or more items; and
providing a list of vendors where the owner may obtain labels or labeled containers, wherein the list of vendors is based on one or more of a current location of the owner or promotional agreements with the vendor.

14. The processor readable non-transitory storage media of claim 13, wherein the one or more cellular or wifi networks are periodically tested for qualifications to determine which networks are available to communicate item information having one or more types of media formats that include one or more of text, images, or audio, and wherein a user includes one or more of the owner or a new owner of the one or more items.

15. The processor readable non-transitory storage media of claim 13, wherein execution of the instructions by one or more hardware processors performs actions, further comprising:
providing one or more scheduling options to collect the one or more items from the current location and transfer them to the off-premises storage location for the owner of the one or more items.

16. The processor readable non-transitory storage media of claim 13, wherein the collection instructions include that portion of the item information that includes, the location, the item dimensions and the unique label identifier.

17. The processor readable non-transitory storage media of claim 13, wherein execution of the instructions by one or more hardware processors performs actions, further comprising:
providing at least a portion of the item information associated with the one or more items to an online marketplace; and
wherein the online marketplace provides instructions to the distribution organization to transfer purchased items to the new owner.

* * * * *